(12) United States Patent
Kitani et al.

(10) Patent No.: US 9,979,874 B2
(45) Date of Patent: May 22, 2018

(54) IMAGE CAPTURING APPARATUS AND PIXEL SCANNING METHOD FOR IMAGE GENERATION

(71) Applicant: CANON KABUSHIKI KAISHA, Tokyo (JP)

(72) Inventors: Kazunari Kitani, Yokohama (JP); Minoru Hirose, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 100 days.

(21) Appl. No.: 14/276,472

(22) Filed: May 13, 2014

(65) Prior Publication Data

US 2014/0340565 A1 Nov. 20, 2014

(30) Foreign Application Priority Data

May 17, 2013 (JP) .................................. 2013-105626
Jan. 28, 2014 (JP) ................................ 2014-013641

(51) Int. Cl.
| | |
|---|---|
| H04N 5/374 | (2011.01) |
| H04N 5/347 | (2011.01) |
| H04N 5/232 | (2006.01) |
| H04N 5/345 | (2011.01) |
| H04N 5/369 | (2011.01) |

(52) U.S. Cl.
CPC ......... *H04N 5/23212* (2013.01); *H04N 5/347* (2013.01); *H04N 5/3456* (2013.01); *H04N 5/3696* (2013.01); *H04N 5/374* (2013.01)

(58) Field of Classification Search
CPC .. H04N 5/23212; H04N 5/3456; H04N 5/374; H04N 5/3696; H04N 5/347
See application file for complete search history.

(56) References Cited

U.S. PATENT DOCUMENTS

| | | | | |
|---|---|---|---|---|
| 2009/0135273 | A1* | 5/2009 | Kusaka | H04N 5/23212 348/222.1 |
| 2009/0140122 | A1* | 6/2009 | Suzuki | H04N 5/37457 250/201.2 |

(Continued)

FOREIGN PATENT DOCUMENTS

| | | |
|---|---|---|
| CN | 102318335 A | 1/2012 |
| CN | 103501405 A | 1/2014 |

(Continued)

OTHER PUBLICATIONS

The above foreign patent documents were cited in a Dec. 1, 2016 Chinese Office Action, that issued in Chinese Patent Application No. 201410208802.1.

*Primary Examiner* — Albert Cutler
(74) *Attorney, Agent, or Firm* — Cowan, Liebowitz & Latman, P.C.

(57) ABSTRACT

An image capturing apparatus comprises an imaging unit that includes imaging pixels that are arranged in a two-dimensional array and focus detection pixels arranged in part of the array of the imaging pixels, and a control unit that controls to read out pixel signals of imaging lines including the imaging pixels each configured to output a signal used for image generation, and pixel signals of focus detection lines including the focus detection pixels, wherein the control unit changes one of a thinning method and an addition method between the imaging lines and the focus detection lines.

18 Claims, 24 Drawing Sheets

(56) References Cited

U.S. PATENT DOCUMENTS

| | | | | |
|---|---|---|---|---|
| 2010/0245631 A1* | 9/2010 | Hoda | .................... | G03B 13/36 |
| | | | | 348/241 |
| 2011/0228145 A1* | 9/2011 | Kimura | ................. | G02B 7/102 |
| | | | | 348/247 |
| 2012/0176520 A1* | 7/2012 | Hara | .................. | H04N 5/23212 |
| | | | | 348/246 |
| 2013/0002911 A1* | 1/2013 | Miyashita | .......... | H04N 5/23212 |
| | | | | 348/247 |
| 2014/0232913 A1* | 8/2014 | Sakane | ................. | H04N 5/235 |
| | | | | 348/294 |
| 2014/0333790 A1* | 11/2014 | Wakazono | ......... | H04N 5/23241 |
| | | | | 348/222.1 |
| 2015/0264251 A1* | 9/2015 | Ito | ........................... | G02B 7/34 |
| | | | | 348/345 |

FOREIGN PATENT DOCUMENTS

| | | |
|---|---|---|
| JP | 2000-156823 A | 6/2000 |
| JP | 2010-219958 A | 9/2010 |

\* cited by examiner

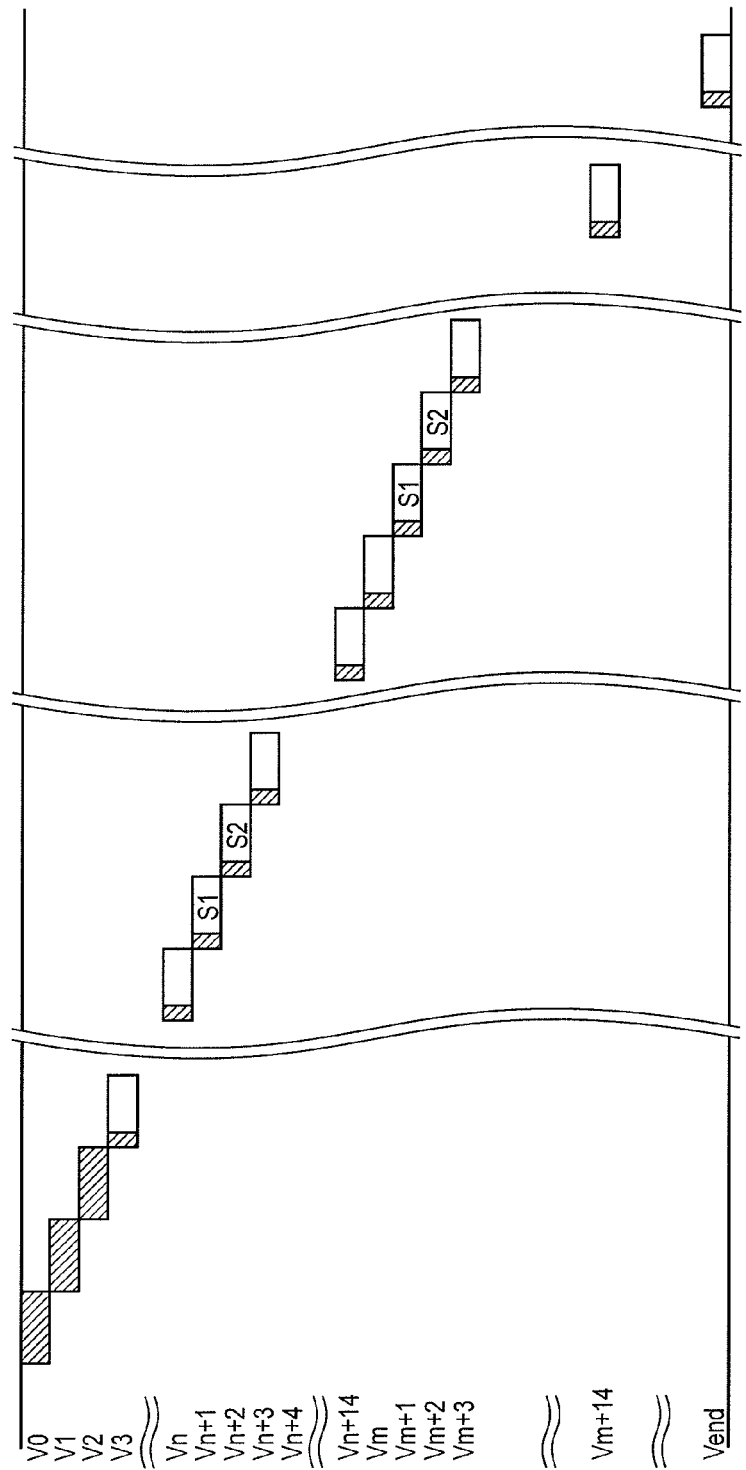

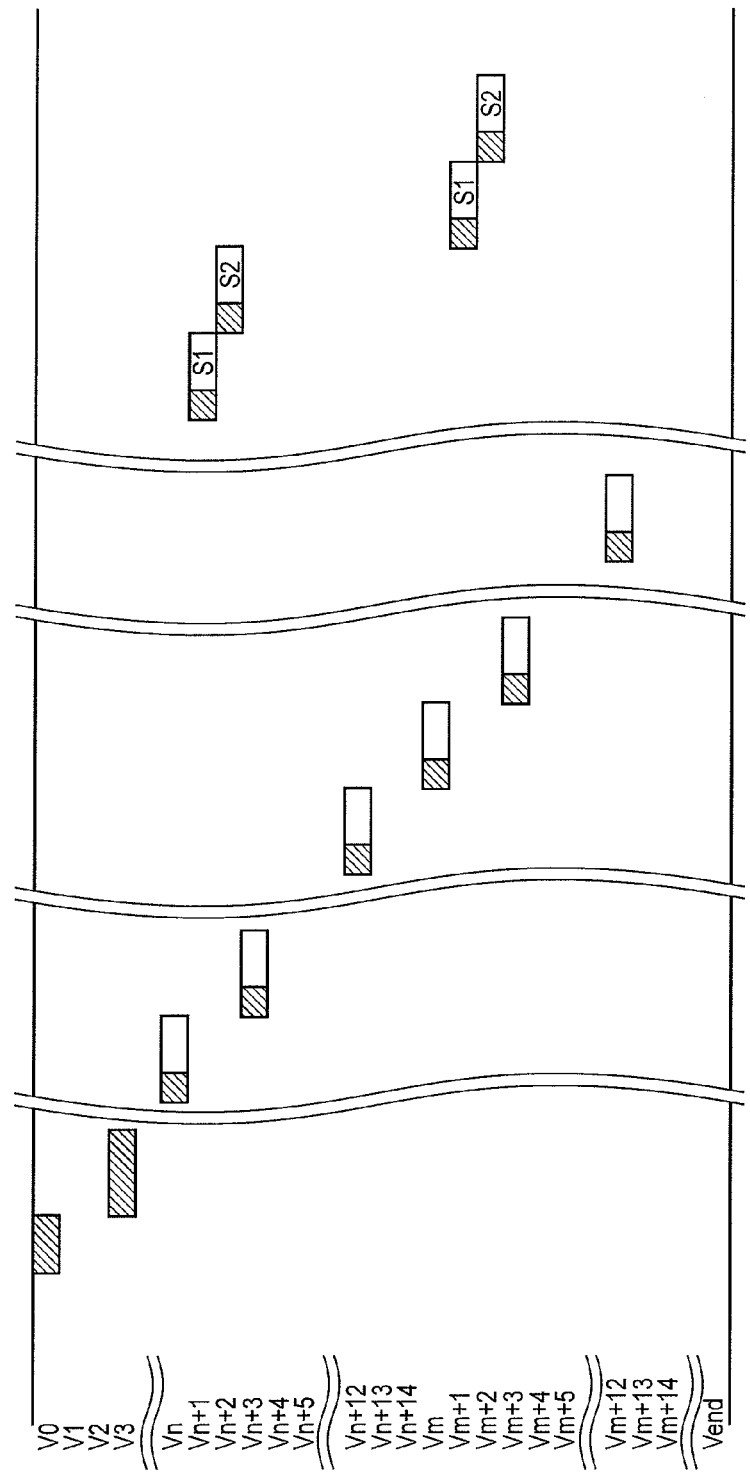

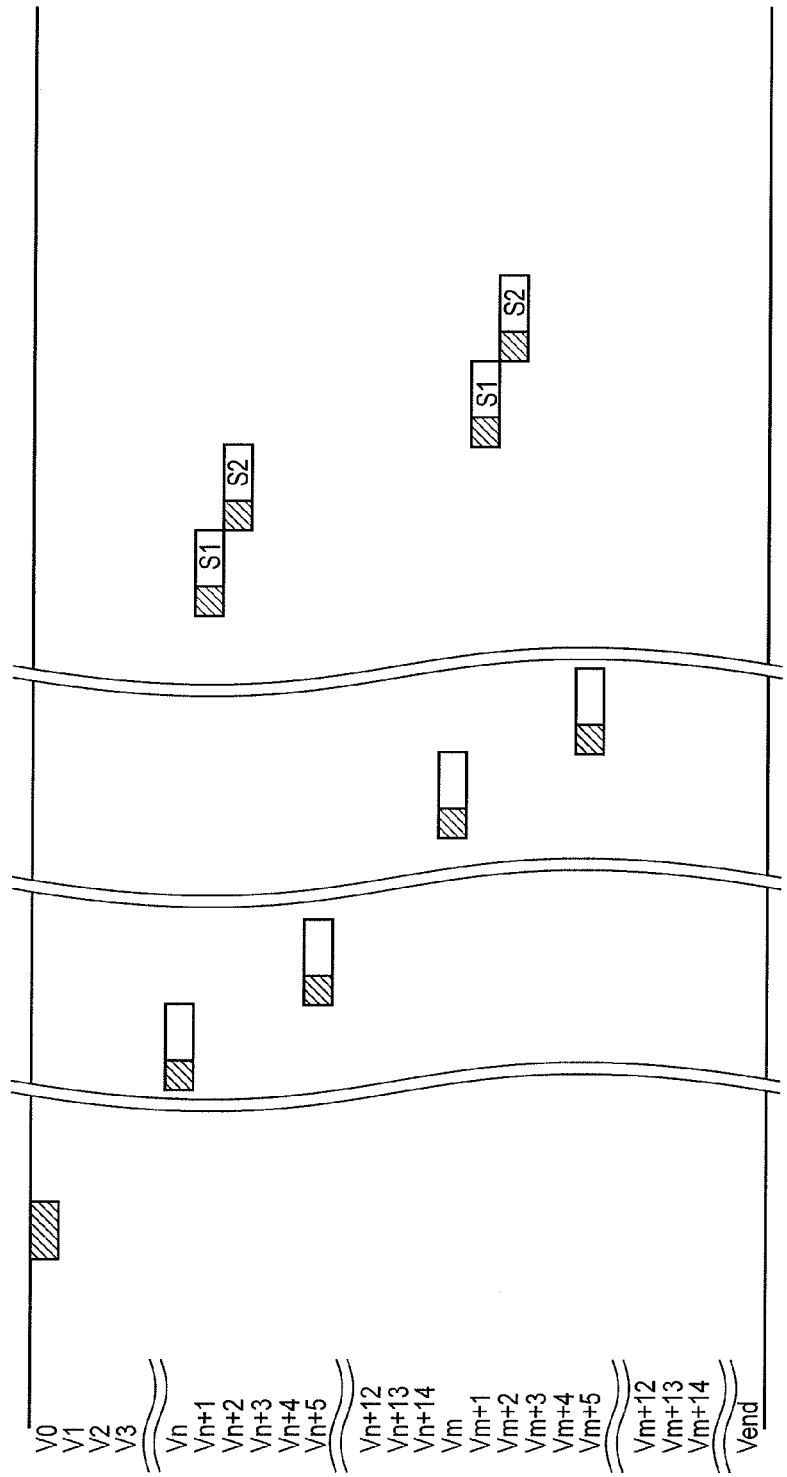

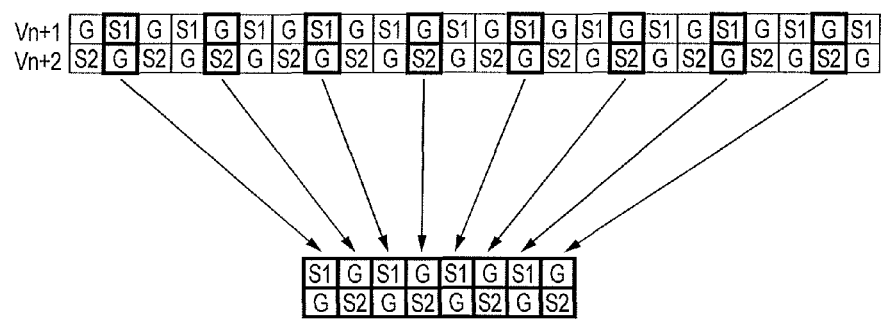
F I G. 11A
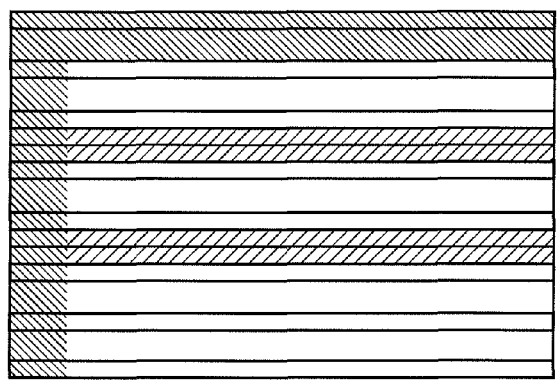
F I G. 11B
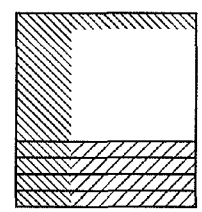
F I G. 11C

Vn+1 | G | S1 | G | S1 | G | S1 | G | S1 | G | S1 | G | S1 | G | S1 | G | S1 | G | S1 | G | S1 | G | S1
Vn+2 | S2 | G | S2 | G | S2 | G | S2 | G | S2 | G | S2 | G | S2 | G | S2 | G | S2 | G | S2 | G | S2 | G
FIG. 12A
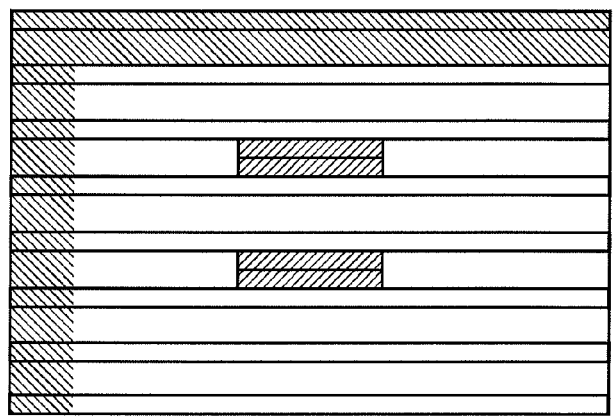   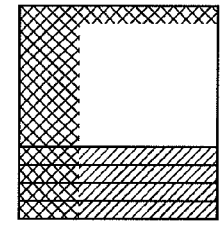
FIG. 12B      FIG. 12C

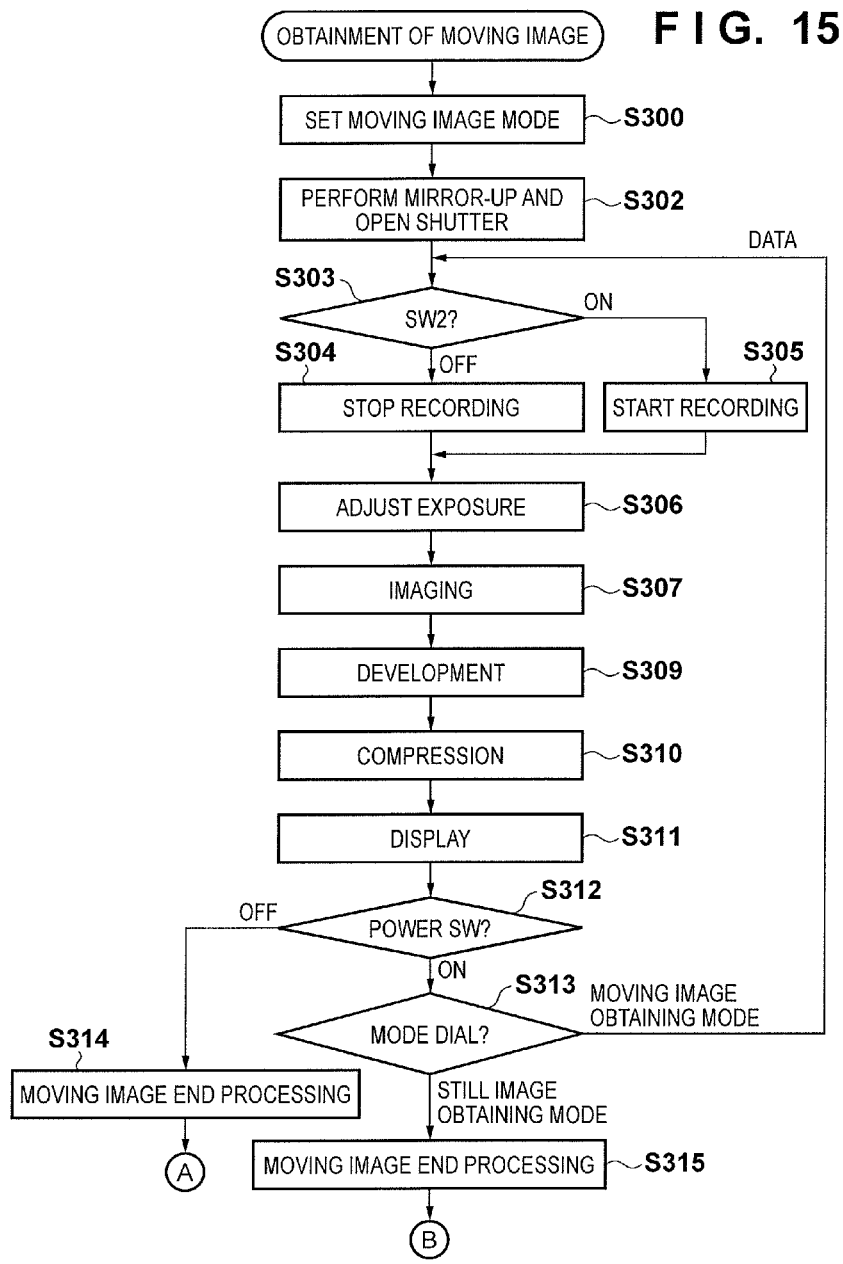

FIG. 17A

|  | Hn | Hn+1 | Hn+2 | Hn+3 | Hn+4 | Hn+5 | Hn+6 | Hn+7 | Hn+8 | Hn+9 | Hn+10 | Hn+11 | Hn+12 | Hn+13 | Hn+14 | Hn+15 | Hn+16 | Hn+17 | Hn+18 | Hn+19 | Hn+20 | Hn+21 | Hn+22 | Hn+23 |
|---|---|---|---|---|---|---|---|---|---|---|---|---|---|---|---|---|---|---|---|---|---|---|---|---|
| Vn | R | G | R | G | R | G | R | G | R | G | R | G | R | G | R | G | R | G | R | G | R | G | R | G |
| Vn+1 | G | B | G | B | G | B | G | B | G | B | G | B | G | B | G | B | G | B | G | B | G | B | G | B |
| Vn+2 | R | G | R | G | R | G | R | G | R | G | R | G | R | G | R | G | R | G | R | G | R | G | R | G |
| Vn+3 | G | B | G | B | G | B | G | B | G | B | G | B | G | B | G | B | G | B | G | B | G | B | G | B |
| Vn+4 | R | G | R | G | R | G | R | G | R | G | R | G | R | G | R | G | R | G | R | G | R | G | R | G |
| Vn+5 | G | B | G | B | G | B | G | B | G | B | G | B | G | B | G | B | G | B | G | B | G | B | G | B |
| Vn+6 | R | G | R | G | R | G | R | G | R | G | R | G | R | G | R | G | R | G | R | G | R | G | R | G |
| Vn+7 | G | S1 | G | S1 | G | S1 | G | S1 | G | S1 | G | S1 | G | S1 | G | S1 | G | S1 | G | S1 | G | S1 | G | S1 |
| Vn+8 | R | G | R | G | R | G | R | G | R | G | R | G | R | G | R | G | R | G | R | G | R | G | R | G |
| Vn+9 | G | B | G | B | G | B | G | B | G | B | G | B | G | B | G | B | G | B | G | B | G | B | G | B |
| Vn+10 | R | G | R | G | R | G | R | G | R | G | R | G | R | G | R | G | R | G | R | G | R | G | R | G |
| Vn+11 | G | S2 | G | S2 | G | S2 | G | S2 | G | S2 | G | S2 | G | S2 | G | S2 | G | S2 | G | S2 | G | S2 | G | S2 |
| Vn+12 | R | G | R | G | R | G | R | G | R | G | R | G | R | G | R | G | R | G | R | G | R | G | R | G |
| Vn+13 | G | B | G | B | G | B | G | B | G | B | G | B | G | B | G | B | G | B | G | B | G | B | G | B |
| Vn+14 | R | G | R | G | R | G | R | G | R | G | R | G | R | G | R | G | R | G | R | G | R | G | R | G |

FIG. 17B

|  | Hn | Hn+1 | Hn+2 | Hn+3 | Hn+4 | Hn+5 | Hn+6 | Hn+7 | Hn+8 | Hn+9 | Hn+10 | Hn+11 | Hn+12 | Hn+13 | Hn+14 | Hn+15 | Hn+16 | Hn+17 | Hn+18 | Hn+19 | Hn+20 | Hn+21 | Hn+22 | Hn+23 |
|---|---|---|---|---|---|---|---|---|---|---|---|---|---|---|---|---|---|---|---|---|---|---|---|---|
| Vn | R | G | R | G | R | G | R | G | R | G | R | G | R | G | R | G | R | G | R | G | R | G | R | G |
| Vn+1 | G | B | G | B | G | B | G | B | G | B | G | B | G | B | G | B | G | B | G | B | G | B | G | B |
| Vn+2 | R | G | R | G | R | G | R | G | R | G | R | G | R | G | R | G | R | G | R | G | R | G | R | G |
| Vn+3 | G | B | G | B | G | B | G | B | G | B | G | B | G | B | G | B | G | B | G | B | G | B | G | B |
| Vn+4 | R | G | R | G | R | G | R | G | R | G | R | G | R | G | R | G | R | G | R | G | R | G | R | G |
| Vn+5 | G | B | G | B | G | B | G | B | G | B | G | B | G | B | G | B | G | B | G | B | G | B | G | B |
| Vn+6 | R | G | R | G | R | G | R | G | R | G | R | G | R | G | R | G | R | G | R | G | R | G | R | G |
| Vn+7 | G | S1 | G | S1 | G | S1 | G | S1 | G | S1 | G | S1 | G | S1 | G | S1 | G | S1 | G | S1 | G | S1 | G | S1 |
| Vn+8 | R | G | R | G | R | G | R | G | R | G | R | G | R | G | R | G | R | G | R | G | R | G | R | G |
| Vn+9 | G | B | G | B | G | B | G | B | G | B | G | B | G | B | G | B | G | B | G | B | G | B | G | B |
| Vn+10 | R | G | R | G | R | G | R | G | R | G | R | G | R | G | R | G | R | G | R | G | R | G | R | G |
| Vn+11 | G | S2 | G | S2 | G | S2 | G | S2 | G | S2 | G | S2 | G | S2 | G | S2 | G | S2 | G | S2 | G | S2 | G | S2 |
| Vn+12 | R | G | R | G | R | G | R | G | R | G | R | G | R | G | R | G | R | G | R | G | R | G | R | G |
| Vn+13 | G | B | G | B | G | B | G | B | G | B | G | B | G | B | G | B | G | B | G | B | G | B | G | B |
| Vn+14 | R | G | R | G | R | G | R | G | R | G | R | G | R | G | R | G | R | G | R | G | R | G | R | G |

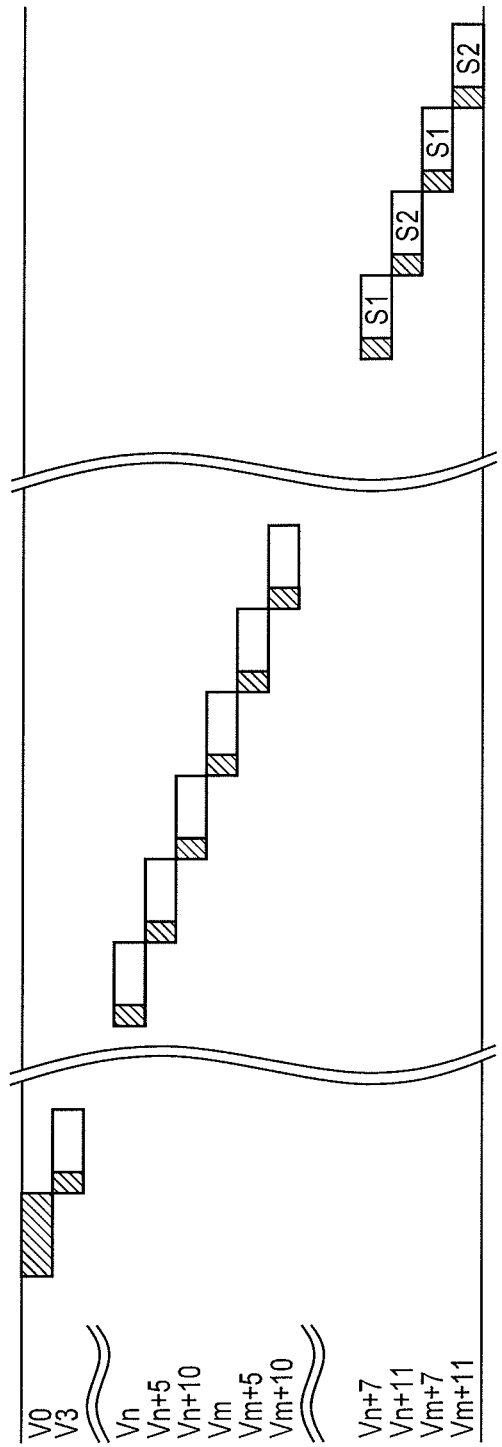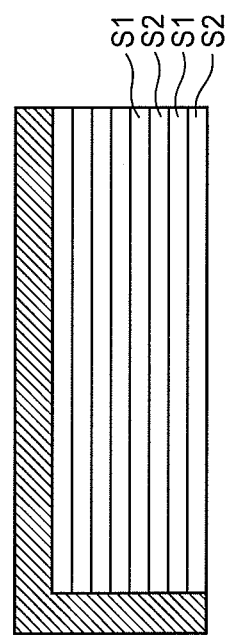

IMAGE CAPTURING APPARATUS AND PIXEL SCANNING METHOD FOR IMAGE GENERATION

BACKGROUND OF THE INVENTION

Field of the Invention

The present invention relates to an image capturing apparatus using an image pickup device having a focus detection function based on a phase difference method.

Description of the Related Art

A contrast detection method has conventionally been known as a general method using a light beam having passed through an imaging lens in an automatic focus detection/adjustment method for an image capturing apparatus. This method uses an image pickup device as a focus detection sensor, and can adjust the focus by evaluating an output signal from the image pickup device and moving the focus lens position to maximize the contrast. However, contrast information needs to be evaluated while moving the imaging lens. After it is detected as the evaluation result that the contrast is maximum, the focus lens needs to be moved again to the maximum-contrast position. Therefore, focus detection takes time, and a high-speed operation is difficult.

To solve this problem, there is proposed a technique capable of directly obtaining the focus shift amount of an imaging lens while using an image pickup device as a focus detection element by incorporating the phase difference detection function in the image pickup device.

For example, in Japanese Patent Laid-Open No. 2000-156823, a pupil division function is given to some light receiving elements in an image pickup device by decentering the sensitive region of a light receiving unit from the optical axis of an on-chip microlens. These pixels are arranged in the image pickup device at a predetermined interval, implementing the phase difference detection function.

Japanese Patent Laid-Open No. 2010-219958 discloses the following technique: focus detection pixels are arranged on rows which are thinned out in thinning readout. When displaying a moving image, the thinned-out rows are read out and displayed to read out rows necessary for moving image display. Further, vertical scanning is performed to read out rows on which focus detection pixels are arranged in the same frame. In addition, the accumulation time is switched between the rows necessary for moving image display, and the rows on which the focus detection pixels are arranged. Accordingly, accumulation control is performed to achieve proper exposures on these rows. By this control, a high S/N ratio of the focus detection pixels can also be ensured.

However, the conventional technique disclosed in Japanese Patent Laid-Open No. 2000-156823 described above has three readout modes: a still image mode in which all pixels are read out, a thinning readout mode in which rows each including only imaging pixels are read out, and a distance measurement readout mode in which only focus detection pixels are read out. In an electronic viewfinder mode and moving image mode, the frame rate of a moving image can be increased by thinning readout. However, since no focus detection pixel is read out, high-speed focus detection using the phase difference method cannot be performed.

The conventional technique disclosed in Japanese Patent Laid-Open No. 2010-219958 discloses vertical interlaced scanning out of readout methods of reading out pixels while thinning them out. When generating a moving image from a multi-pixel image pickup device optimized for recent still images, moving image data are preferably acquired at various thinning rates. However, this has not been considered so far.

For example, a mode in which the thinning rate is relatively low to obtain high-resolution moving image data having a large number of recording pixels, and a mode in which the thinning rate is relatively high to obtain moving image data having a high frame rate will be examined. In this case, if the same thinning readout as that for imaging pixels is performed on rows on which focus detection pixels are arranged, outputs from the intentionally arranged focus detection pixels may be thinned out and may not be read out depending on the arrangement density of the phase difference detection pixels.

SUMMARY OF THE INVENTION

The present invention has been made to solve the above-described problems, and implements high-speed focus detection by efficiently reading out outputs from focus detection pixels when performing focus detection based on the phase difference method during display of a moving image.

According to a first aspect of the present invention, there is provided an image capturing apparatus comprising: an imaging unit that includes imaging pixels that are arranged in a two-dimensional array and focus detection pixels arranged in part of the array of the imaging pixels; and a control unit that controls to read out pixel signals of imaging lines including the imaging pixels each configured to output a signal used for image generation, and pixel signals of focus detection lines including the focus detection pixels, wherein the control unit changes one of a thinning method and an addition method between the imaging lines and the focus detection lines.

According to a second aspect of the present invention, there is provided an image capturing apparatus comprising: an image pickup device that includes a plurality of imaging pixels configured to capture an object image, and focus detection pixels arranged in an arrangement of the plurality of imaging pixels; and a readout control unit that includes a first readout mode in which pixels of the image pickup device are thinned out at a predetermined thinning rate and signals of the pixels are read out, and a second readout mode in which the pixels of the image pickup device are thinned out at a thinning rate higher than the predetermined thinning rate and signals of the pixels are read out, the readout control unit controlling, in readout for image generation in the first readout mode and the second readout mode, not to read out a row of the image pickup device on which the focus detection pixels are arranged, wherein the readout control unit performs second vertical scanning of reading out the row of the image pickup device on which the focus detection pixels are arranged, before or after performing first vertical scanning of performing readout for image generation in the first readout mode and the second readout mode.

According to a third aspect of the present invention, there is provided a method of controlling an image capturing apparatus including an image pickup device that includes a plurality of imaging pixels configured to capture an object image, and focus detection pixels arranged in an arrangement of the plurality of imaging pixels, the method comprising: a readout control step of controlling not to read out, in readout for image generation in a first readout mode and a second readout mode, a row of the image pickup device on which the focus detection pixels are arranged, the readout control step including the first readout mode in which pixels of the image pickup device are thinned out at a predetermined thinning rate and signals of the pixels are read out, and the second readout mode in which the pixels of the image pickup device are thinned out at a thinning rate higher than the predetermined thinning rate and signals of the pixels are read out, wherein in the readout control step, second vertical scanning of reading out the row of the image pickup device on which the focus detection pixels are arranged is performed before or after performing first vertical scanning of performing readout for image generation in the first readout mode and the second readout mode.

According to a fourth aspect of the present invention, there is provided a method of controlling an image capturing apparatus including an imaging unit that includes imaging pixels that are arranged in a two-dimensional array and focus detection pixels arranged in part of the array of the imaging pixels, the method comprising: a control step of controlling to read out pixel signals of imaging lines including the imaging pixels each configured to output a signal used for image generation, and pixel signals of focus detection lines including the focus detection pixels, wherein in the control step, one of a thinning method and an addition method is changed between the imaging lines and the focus detection lines.

Further features of the present invention will become apparent from the following description of exemplary embodiments with reference to the attached drawings.

BRIEF DESCRIPTION OF THE DRAWINGS

FIGS. 4A and 4B are views showing the pixel arrangement of an image pickup device;

FIG. 8 is a view showing an operation when obtaining a still image in the image capturing apparatus;

FIGS. 9A to 9C are views showing an operation in the first moving image obtaining mode in the image capturing apparatus;

FIGS. 10A to 10C are views showing an operation in the second moving image obtaining mode in the image capturing apparatus;

FIGS. 11A to 11C are views showing readout pixels in the moving image obtaining mode in the image capturing apparatus;

FIGS. 12A to 12C are views showing readout pixels in the moving image obtaining mode in the image capturing apparatus;

FIG. 15 is a flowchart showing an operation when obtaining a moving image in the image capturing apparatus;

FIGS. 17A and 17B are views showing the pixel arrangement of an image pickup device used in the third embodiment;

FIGS. 20A to 20C are views for explaining a readout operation in the high-speed mode for a moving image according to the third embodiment.

DESCRIPTION OF THE EMBODIMENTS

Embodiments of the present invention will now be described in detail with reference to the accompanying drawings.

(First Embodiment)

Figure 1:
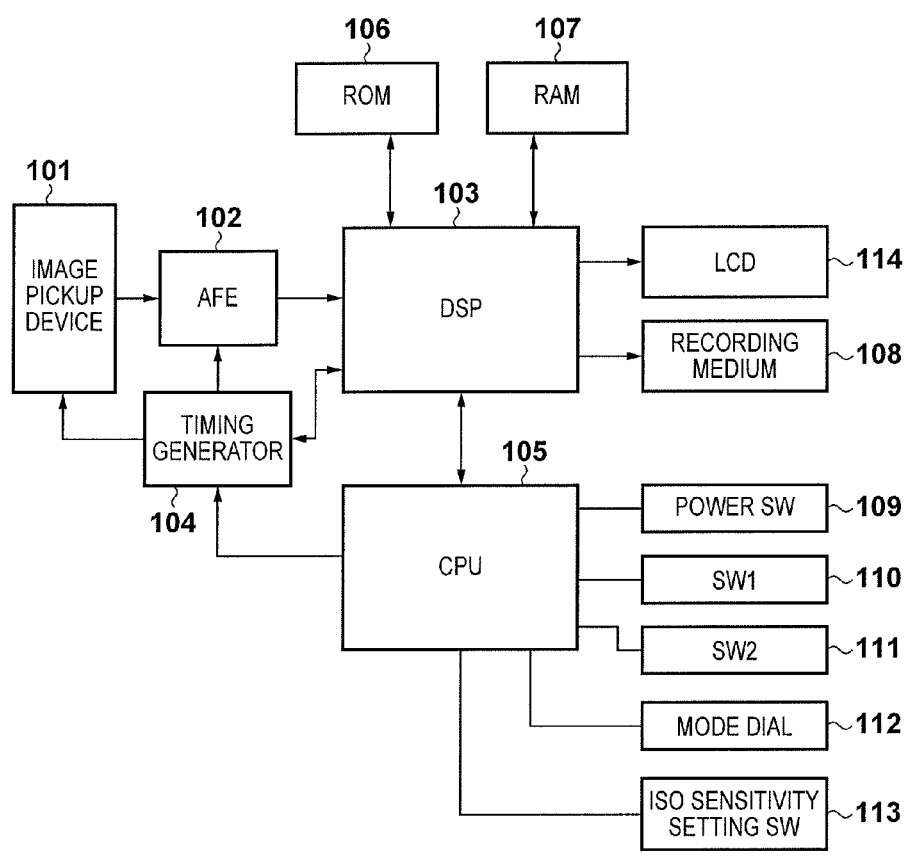
FIG. 1 is a block diagram showing an image capturing apparatus according to the first embodiment of the present invention.

FIG. 1 is a block diagram showing an image capturing apparatus according to the first embodiment of the present invention. The image capturing apparatus according to the embodiment includes a CMOS image pickup device 101, AFE (Analog Front End) 102, DSP (Digital Signal Processor) 103, timing generator (TG) 104, and CPU 105. Note that the CMOS image pickup device 101 incorporates an amplifier circuit (not shown) which switches the gain in accordance with the ISO sensitivity.

The AFE 102 incorporates an A/D converter which converts an analog signal from the image pickup device 101 into a digital signal, and has a function of clamping the dark offset level. The DSP 103 performs various correction processes, development processing, and compression processing on a data signal output from the AFE 102. The DSP 103 performs access processing to various memories such as a ROM 106 and RAM 107, write processing of image data on a recording medium 108, display processing of various data on an LCD 114, and the like. The DSP 103 can also perform various correction processes on image data on the RAM 107.

The DSP 103 performs detection of various noise components and defective pixels generated in the CMOS image pickup device 101, correction processing of defective pixels and phase difference detection pixels, and the like. Further, the DSP 103 includes a correction block which performs correction processing on neighboring pixels around phase difference detection pixels, and an AF calculation block which calculates autofocus information by using outputs from phase difference detection pixels, details of which will be described later.

The TG 104 supplies clock signals and control signals to the image pickup device 101, AFE 102, and DSP 103 under the control of the CPU 105. The TG 104 generates timing signals corresponding to various readout modes of the CMOS image pickup device 101 in cooperation with the DSP 103.

The CPU 105 performs, for example, control of the DSP 103 and TG 104, photometry, and AF using an output from a distance measurement element which is independent of an image pickup device (not shown) and performs phase difference AF. Also, the CPU 105 controls a camera function such as AF using autofocus information which is calculated using outputs from phase difference detection pixels built in the image pickup device 101.

For example, a power switch 109, a shutter switch SW1 110 in the first stage, a shutter switch SW2 111 in the second stage, a mode dial 112, and an ISO sensitivity setting switch 113 are connected to the CPU 105. The CPU 105 executes processing corresponding to the setting states of the switches and dial.

The ROM 106 stores the control programs of the image capturing apparatus, that is, programs to be executed by the CPU 105, and various correction data and the like. The ROM 106 is generally formed from a flash memory. The RAM 107 is configured so that it can be accessed more quickly than the ROM 106. The RAM 107 is used as a work area, and temporarily stores image data to be processed by the DSP 103, and the like.

As the recording medium 108, for example, a memory card which saves obtained image data is used. The recording medium 108 is connected to the DSP 103 via, for example, a connector (not shown).

The user operates the power switch 109 when activating the image capturing apparatus. When the shutter switch SW1 in the first stage is turned on, the image capturing apparatus executes pre-processing before imaging, including photometry processing and distance measurement processing. When the shutter switch SW2 in the second stage is turned on, the image capturing apparatus starts a series of image capturing operations to drive a mirror and shutter (not shown) and write image data captured by the image pickup device 101 on the recording medium 108 via the AFE 102 and DSP 103. The mode dial 112 is used to set various operation modes of the image capturing apparatus. The ISO sensitivity setting switch 113 is used to set the imaging ISO sensitivity of the image capturing apparatus. The LCD 114 displays camera information, and plays back and displays an obtained image or displays moving image data.

Figure 2A:
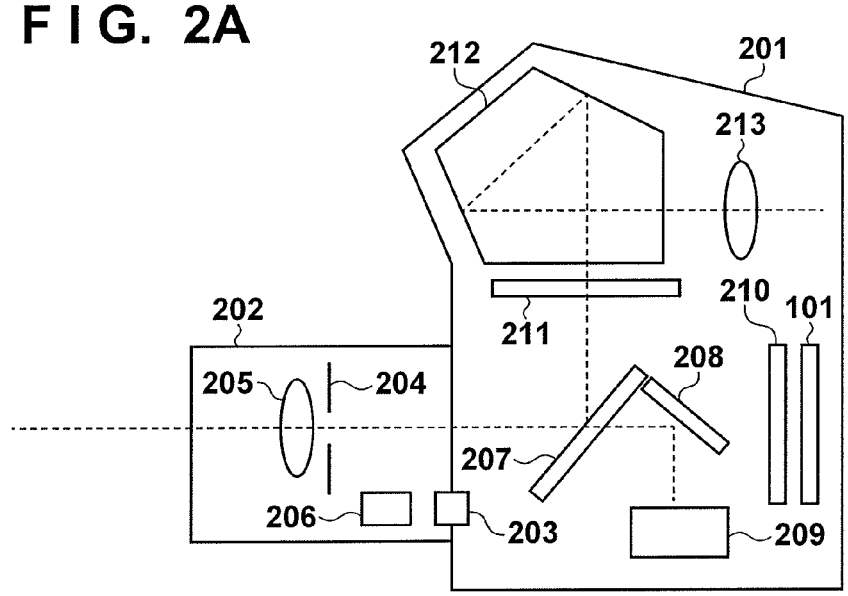
FIGS. 2A and 2B are views showing the mechanism of the image capturing apparatus according to the first embodiment of the present invention.
Figure 2B:
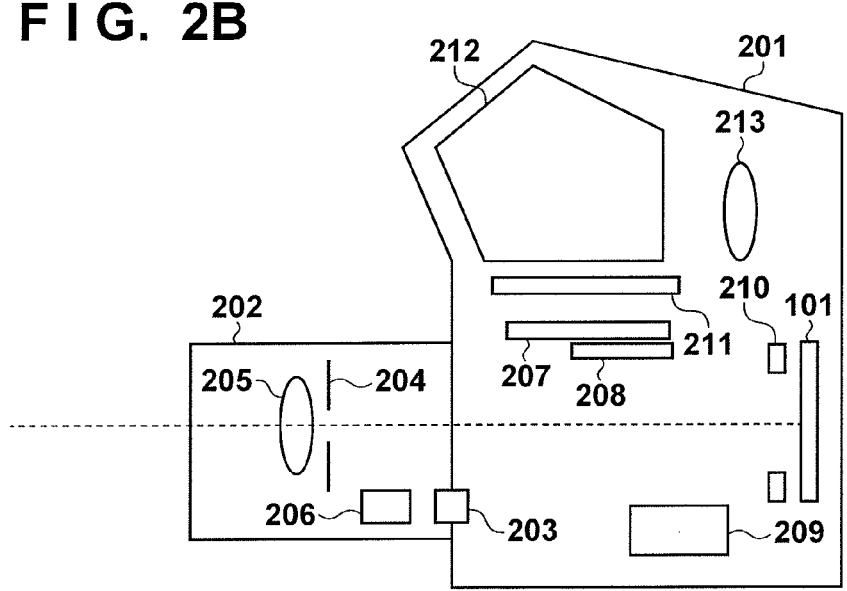

Next, the mechanical configuration of the image capturing apparatus will be described with reference to FIGS. 2A and 2B. FIGS. 2A and 2B are side sectional views showing the configuration of a digital single-lens reflex camera serving as the image capturing apparatus according to the embodiment. This camera takes a state when an optical viewfinder is used to obtain a still image, and a state in which the mirror is up and the shutter is open when a moving image is obtained or the live view is used. FIG. 2A shows the state when the optical viewfinder is used. FIG. 2B shows the state in which the mirror is up and the shutter is open when a moving image is obtained and the live view is used.

When the optical viewfinder is used for a still image, as shown in FIG. 2A, an imaging lens 202 is mounted on the front surface of a camera body 201. The imaging lens 202 is interchangeable, and the camera body 201 and imaging lens 202 are electrically connected via a mount contact group 203. A stop 204 and focus adjustment lens group (focus lens) 205 are arranged in the imaging lens 202 and controlled by a lens control device 206.

A main mirror 207 is a half mirror. In the optical viewfinder state of FIG. 2A, the main mirror is arranged obliquely on the imaging optical path, and reflects light traveling from the imaging lens to the viewfinder optical system. The transmitted light enters an AF unit 209 via a sub-mirror 208. The AF unit 209 is an AF sensor complying with the phase difference detection method. Although a detailed description of the phase difference AF will be omitted, the AF operation is performed by controlling the focus adjustment lens group 205 of the imaging lens 202 based on the detection result.

Reference numeral 101 denotes the image pickup device; and 210, a focal plane shutter. The focal plane shutter 210 is normally closed, and is opened for designated seconds only in imaging. Reference numeral 211 denotes a focusing plate; and 212, a pentaprism for changing the optical path. Reference numeral 213 denotes an eyepiece lens group through which the user observes the focusing plate and can confirm an object image.

When the SW1 110 is pressed halfway and turned on in synchronism with a release button (not shown), imaging preparation operations such as AE and AF are performed. When the SW2 111 is pressed fully and turned on, the main mirror 207 and sub-mirror 208 operate to retract from the optical path, and then the focal plane shutter is opened for a predetermined time to expose the image pickup device 101.

FIG. 2B shows the state when the live view or moving image is used. When the mode is switched by a dial (not shown) to set, for example, the live view state, the main mirror 207 and sub-mirror 208 operate to retract from the optical path and hold this state, similar to obtaining a still image. The focal plane shutter 210 also holds the open state to always expose the image pickup device 101. A signal obtained from the image pickup device 101 is displayed on the LCD (not shown), implementing the live view mode.

A moving image can be recorded in this state to cope with the moving image mode. In this case, since the sub-mirror has also retracted, no object image enters the AF unit and phase difference AF using the AF unit becomes impossible. Since the main mirror has also retracted, the user cannot confirm an object image by using the optical viewfinder.

Figure 3:
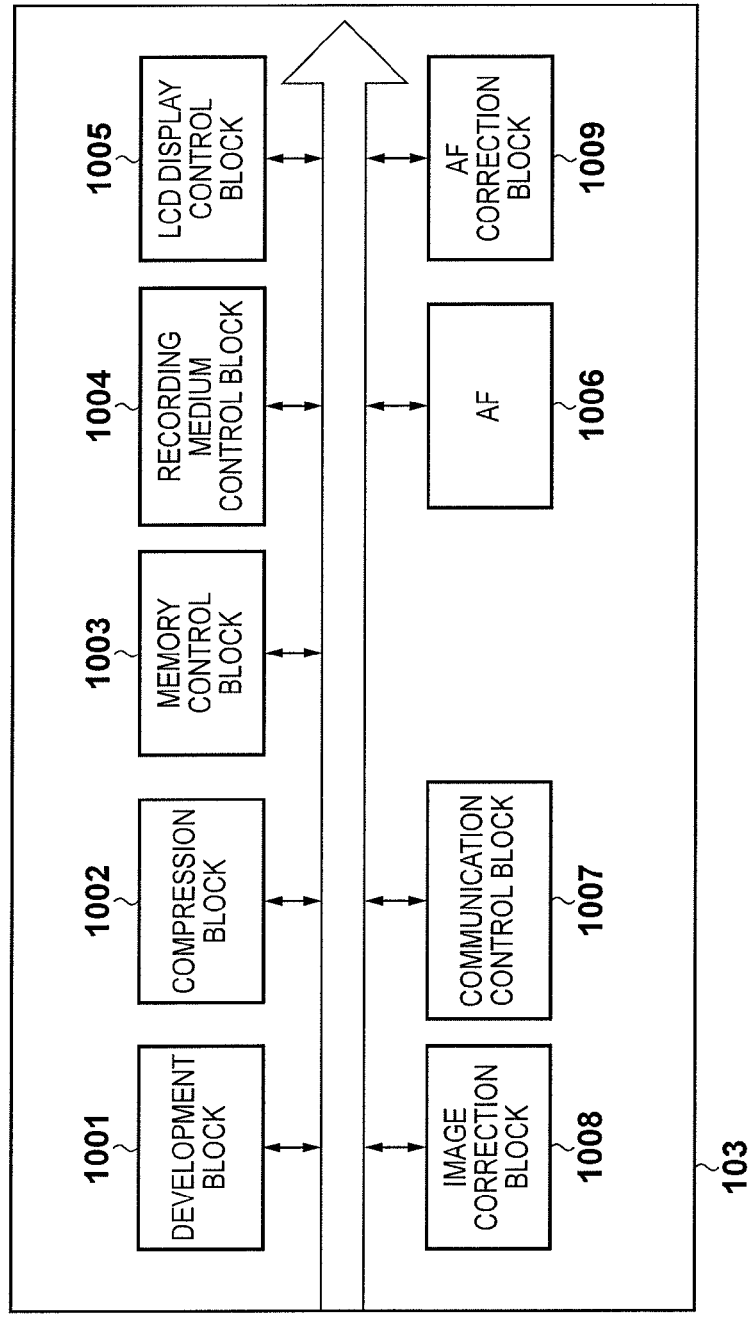
FIG. 3 is a block diagram showing the internal blocks of a DSP in the image capturing apparatus according to the first embodiment.

FIG. 3 is a block diagram showing the internal blocks of the DSP 103. In addition to a development block 1001 and compression block 1002 serving as the basis of image processing described above, the DSP 103 includes a memory control block 1003, recording medium control block 1004, and LCD display control block 1005. Further, the DSP 103 includes an AF block 1006 which calculates autofocus information from an output from the phase difference detection element, and a communication block 1007 which transmits the information to the CPU 105 and generally performs two-way communication with the CPU 105.

The DSP 103 also includes an image correction block 1008 for digitally correcting an error of the sensitivity or dark level from the ideal state of the image pickup device when performing image generation. In addition, the DSP 103 includes an AF correction block 1009 for digitally correcting an error of the sensitivity or dark level from the ideal state of the phase difference detection pixel, and optical conditions such as the focal length and f-number of the imaging lens in imaging before sending data to the AF block 1006.

Figures 4A, 4B:
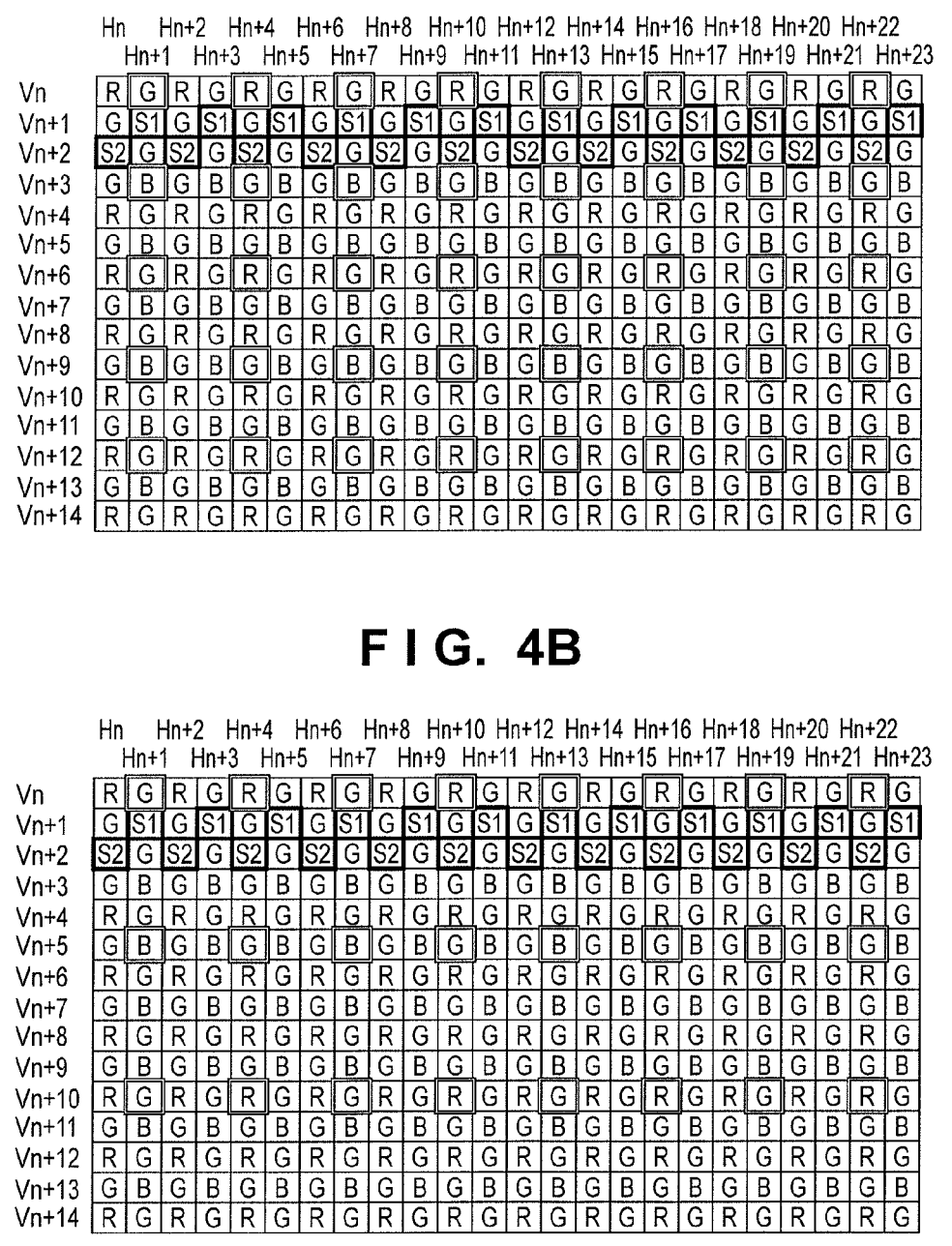

The pixel structure of the image pickup device 101 in the image capturing apparatus shown in FIG. 1 will be described next. FIGS. 4A and 4B show the pixel arrangement of the image pickup device 101 used in the embodiment. FIGS. 4A and 4B show the arrangement of pixels on the image pickup device. In FIGS. 4A and 4B, R represents a normal pixel (imaging pixel) in which a red color filter is arranged, and G and B represent normal pixels in which a green color filter and blue color filter are arranged, respectively. Here, 24 pixels in the horizontal direction×15 pixels in the vertical direction on the image pickup device are extracted and explained. However, the entire image pickup device is basically formed by repeating this arrangement pattern in the horizontal and vertical directions.

Figure 5A:
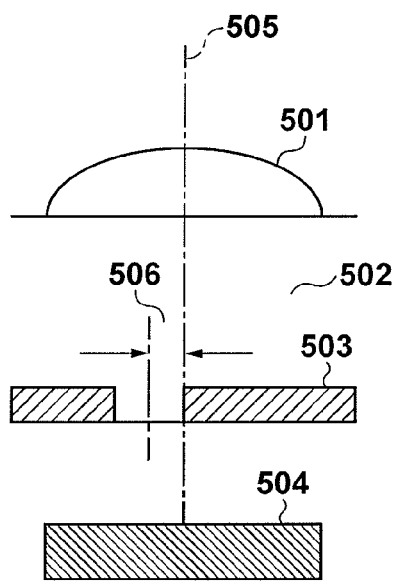
FIGS. 5A and 5B are views each showing the structure of the phase difference detection pixel of the image pickup device.

In FIGS. 4A and 4B, S1 and S2 represent phase difference detection pixels (focus detection pixels) arranged in the arrangement of normal pixels. As shown in FIG. 5A, S1 includes a microlens 501, underlying planarizing layer 502, photodiode 504, and light-shielding wiring layer 503. The pixel S1 is the first phase difference detection pixel in which a slit for regulating the incident direction of incident light is formed in the light-shielding wiring layer 503 in the pixel. The center position of the slit is offset leftward by a phase 506 from an optical axis center 505 of the pixel.

Figure 5B:
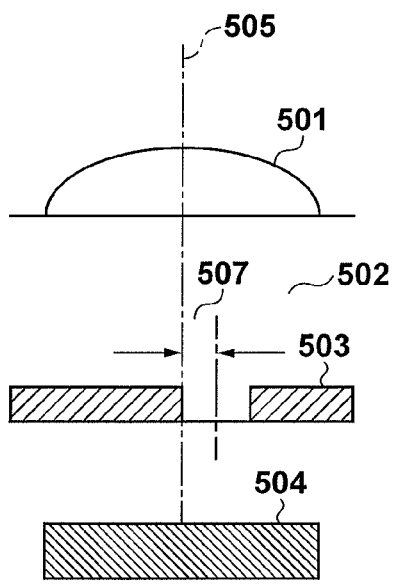

As shown in FIG. 5B, S2 is formed by offsetting, in a direction different from the regulation direction shown in FIG. 5A, a slit for regulating the incident direction of incident light by using a light-shielding film such as an aluminum wiring layer in the pixel. The center position of the slit is offset rightward by a phase 507 from the optical axis center 505 of the pixel. The absolute value of the offset amount in the pixel S2 is equal to that of the offset amount in the pixel S1 though only the direction is different. The pixel S2 is the second phase difference detection pixel.

A pixel group of the pixels S1 having the same phase displacement direction of the slit of the phase difference detection pixel is arranged on a given row Vn+1, as shown in FIG. 4A. A pixel group of the pixels S2 is arranged on a lower row Vn+2. These two rows form one AF frame (AF region). Information about a distance to an object can be calculated by detecting a phase difference from image data of these two groups that are generated from the phase difference detection pixel groups of the respective phases. More specifically, the pixels S1 are arranged regularly in the horizontal direction, and an object image acquired by the group of these pixels is defined as an A image. The pixels S2 are also arranged regularly in the horizontal direction, and an object image acquired by the group of these pixels is defined as a B image. By detecting the relative positions of the A and B images, the focus shift amount (defocus amount) of the object image can be detected.

Figure 6:
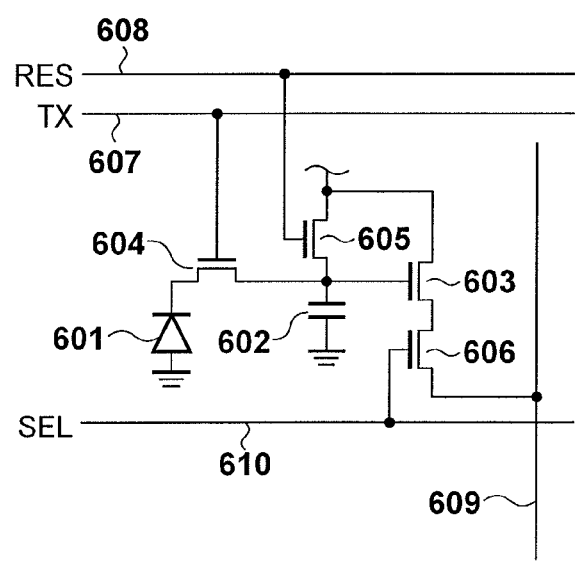
FIG. 6 is a circuit diagram showing the structure of the pixel of the image pickup device.

Next, the operation of the CMOS image pickup device 101 in the embodiment will be described with reference to FIG. 6. FIG. 6 shows the circuit configuration of one pixel of the CMOS image pickup device 101. In FIG. 6, reference numeral 601 denotes a photodiode (to be referred to as PD hereinafter); and 602 and 603, floating diffusion amplifiers which convert signal charges accumulated in the PD 601 into a voltage. The floating diffusion amplifier 602 is a floating diffusion capacitor (FD), and the floating diffusion amplifier 603 is the amplifier of a MOS transistor. A transfer gate (TX) 604 is used to transfer charges in the PD to the FD. A reset gate (RES) 605 is used to reset the PD 601. A transistor (SEL) 606 is used to select a pixel, a common signal line 607 is used to control the TX, a common signal line 608 is used to control the RES, a vertical output line 609 is used to output a voltage output from the FD amplifier, and a signal line 610 is used to control the SEL.

Figure 7:
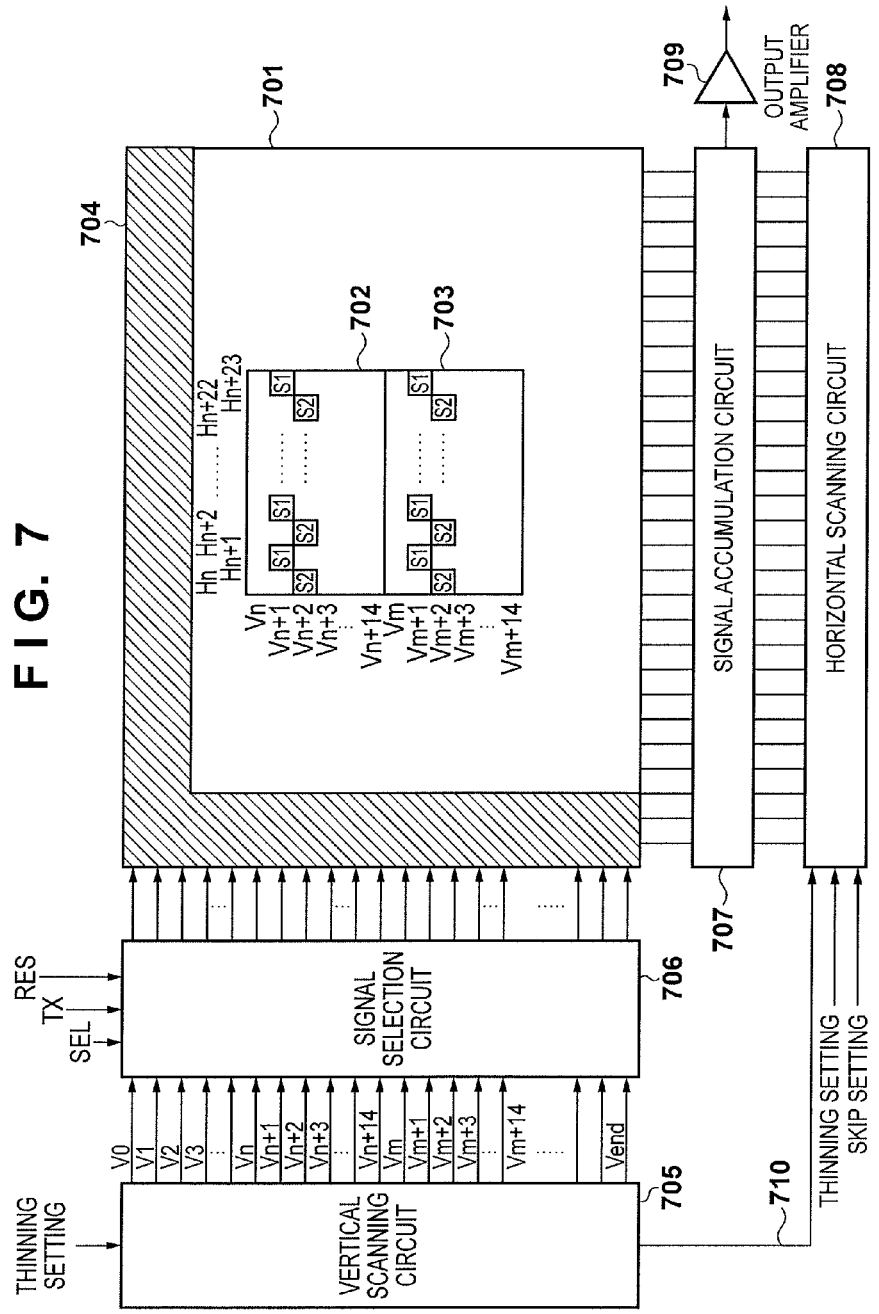
FIG. 7 is a view showing the configuration of the image pickup device.

FIG. 7 is a view showing the overall configuration of the CMOS image pickup device 101. In a pixel portion 701, the basic block shown in FIGS. 4A and 4B is arranged repetitively in the horizontal and vertical directions. FIG. 7 shows a block 702 starting from Vn, and a partial block 703 starting from Vm, which are parts of the pixel portion 701. Note that each pixel takes the structure shown in FIG. 5A or 5B. A hatched pixel portion 704 in FIG. 7 represents a light-shielded optical black portion (OB portion). The OB portion is arranged to be adjacent to the pixel portion 701, and is used to define the black of an obtained image. OB data has a significant value of 0 or more based on noise, and the average value of OB data also becomes a value of 0 or more.

Assuming that the same noise as that of OB data is mixed in an obtained image, a pixel having a smallest value in the obtained image has not a value of 0 but a value equal to or larger than the average value of OB data. Therefore, by subtracting the average value of OB data from the obtained image, the value of a pixel not irradiated with light can be corrected to almost 0. Variations of pixel signals of each column are corrected by output signals from a VOB portion arranged in the horizontal direction. Variations of pixel signals of each row are corrected by output signals from an HOB portion arranged in the vertical direction.

A vertical scanning circuit 705 can control accumulation/readout for each row by sequentially outputting scanning signals. These signals include V1 to V24 for selecting a pixel block. The vertical scanning circuit receives a thinning setting signal for controlling an operation in vertical scanning.

A signal selection circuit 706 receives a reset signal RES, transfer signal TX, and selection signal SEL supplied from the timing generator, and outputs the above-described pixel control signal to a row designated by a scanning signal output from the vertical scanning circuit 705. A signal accumulation circuit 707 accumulates an output from each pixel through the vertical output line when signals are read out from a selected row.

A horizontal scanning circuit 708 sequentially selects pixel signals accumulated in the signal accumulation circuit, and inputs them to an output amplifier 709 to output them outside the CMOS. An output from the horizontal scanning circuit contains H1 and H24 for selecting each column of a pixel block. Setting signals for performing the thinning operation in horizontal scanning and skip scanning are supplied to the horizontal scanning circuit. Also, a control signal 710 for switching control on a specific row is supplied from the vertical scanning circuit 705 in order to control the operation on the specific row.

FIG. 8 is a view for explaining a readout operation in the image capturing apparatus according to the embodiment. This readout operation assumes an operation in the all-pixel readout mode used to read out a still image. In FIG. 8, the abscissa represents the lapse of time, and a frame corresponding to each row represents the time during which the readout operation of each row is performed. A hatched portion in the frame indicates that readout of the OB portion 704 is performed.

The following description assumes that the moving image mode includes, in accordance with the mode dial 112, a "high-resolution mode" in which thinning readout is performed for every third pixel in both the horizontal and vertical directions, and a "high-speed mode" in which thinning readout is performed for every third pixel in the horizontal direction and for every fifth pixel in the vertical direction. The "high-resolution mode" handles high-resolution moving image data having a large number of recording pixels as the output format of a final moving image though this is defined by the readout method of the image pickup device. The "high-speed mode" generally handles moving image data having a high frame rate as the output format of a final moving image.

For example, output formats suited to the respective readout methods are obtained by setting an output having a 1920×1080 moving image size at 30 fps in the "high-resolution mode", and an output having a 1080×720 moving image size at 60 fps in the "high-speed mode".

In the "high-resolution mode" serving as the first mode, every third pixel is read out in the vertical direction, so pixel outputs each surrounded by a double line are read out in the basic block of FIG. 4A. More specifically, pixels on columns Hn+1, Hn+4, Hn+7, Hn+10, Hn+13, Hn+16, Hn+19, and Hn+22 in the horizontal direction and rows Vn, Vn+3, Vn+6, Vn+9, and Vn+12 in the vertical direction are read out. This relationship also applies to a block starting from Vm in the vertical direction.

Figure 9B:
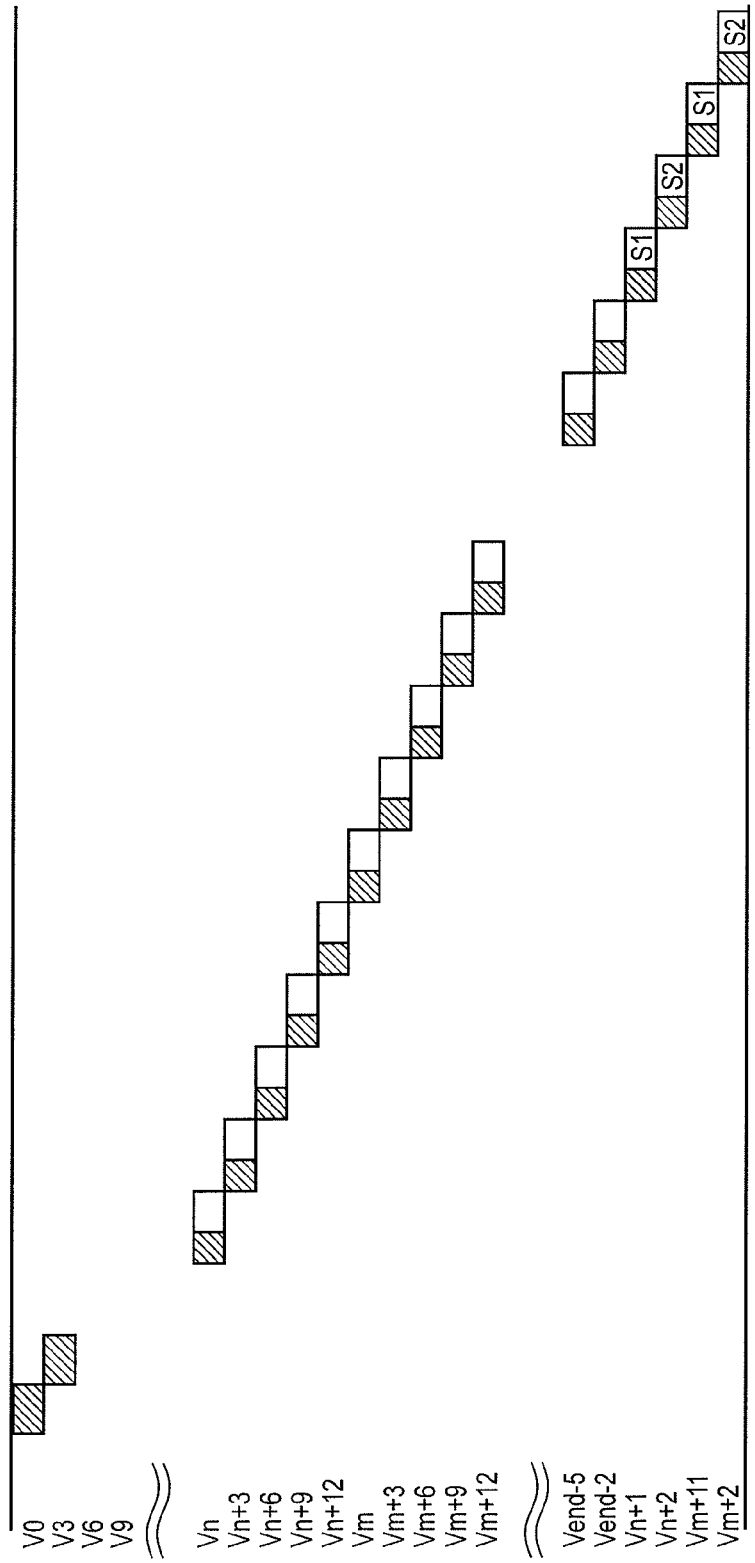
Figure 9C:
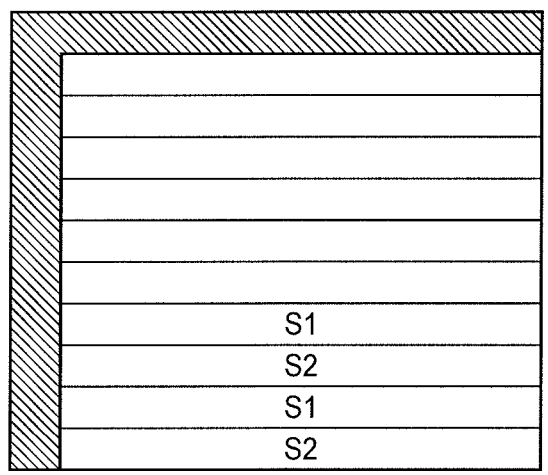

In this case, only by a normal thinning operation, the (Vn+1)th and (Vn+2)th rows on which phase difference detection pixels are arranged are thinned out in the vertical direction and are not read out in the image portion. In the embodiment, however, after the end of the first vertical scanning to read out normal pixels by the thinning operation, the second vertical scanning operation is performed to read out again only rows in each pixel block on which phase difference detection pixels are arranged. FIGS. 9A to 9C show this state.

In FIGS. 9A to 9C, as in FIG. 8, the abscissa represents the lapse of time, and a frame corresponding to each row represents the time during which the readout operation of each row is performed. A hatched portion in the frame indicates that readout of the OB portion 704 is performed. After the end of the first scanning to read out rows up to the (Vend−2)th row, the target row returns to the (Vn+1)th row and the readout operation continues. Upon completion of the second scanning to read out the (Vn+2)th row, and the (Vm+1)th and (Vm+2)th rows serving as the phase difference detection pixel arrangement rows of the next basic block, vertical scanning in readout of one frame ends.

The embodiment has exemplified the block starting from Vn and the block starting from Vm as an example of blocks containing phase difference detection pixels. However, the number of blocks and the arrangement of phase difference detection rows in each block can be arbitrarily set. In any arrangement, it suffices to read out normal pixels while thinning out rows, and then perform readout scanning on rows on which phase difference detection pixels are arranged. The pixels are rearranged in the order of the readout time, as shown in FIG. 9B, and the readout pixel data are arranged as shown in FIG. 9C.

Image data of a row on which phase difference detection pixels are arranged is unnecessary for image generation when reading out a moving image. The development processing block 1001 and compression block 1002 in the DSP 103 generate an image by using image data read out first from the image pickup device during the thinning readout period. Then, the AF block 1006 in the DSP 103 performs only focus detection processing by using image data from subsequent phase difference detection rows.

In FIGS. 9A to 9C, the readout time of each row is shorter than the readout time shown in FIG. 8. This indicates that the number of readout pixels per row is decreased by the horizontal thinning operation, and even if pixels are read out at the same readout speed, the readout time per row is shortened. By reducing the number of readout pixels by the horizontal and vertical thinning operations, a desired frame rate of a moving image can be implemented.

Next, a case in which the "high-speed mode" serving as the second mode is selected with the mode dial 112 will be explained. In this case, since every fifth pixel is read out in the vertical direction, pixel outputs each surrounded by a double line are read out in the basic block of FIG. 4A, as shown in FIG. 4B.

More specifically, pixels on columns Hn+1, Hn+4, Hn+7, Hn+10, Hn+13, Hn+16, Hn+19, and Hn+22 in the horizontal direction, as in the "high-resolution mode", and rows Vn, Vn+5, and Vn+10 in the vertical direction are read out. This relationship also applies to a block starting from Vm in the vertical direction. In this case, only by a normal thinning operation, the (Vn+1)th and (Vn+2)th rows on which phase difference detection pixels are arranged are thinned out in the vertical direction, and are not read out, as in the "high-resolution mode" described above.

In the embodiment, however, after the end of the first vertical scanning to read out normal pixels by the thinning operation, the second vertical scanning operation is performed to read out again only rows in each pixel block on which phase difference detection pixels are arranged.

Figure 10B:
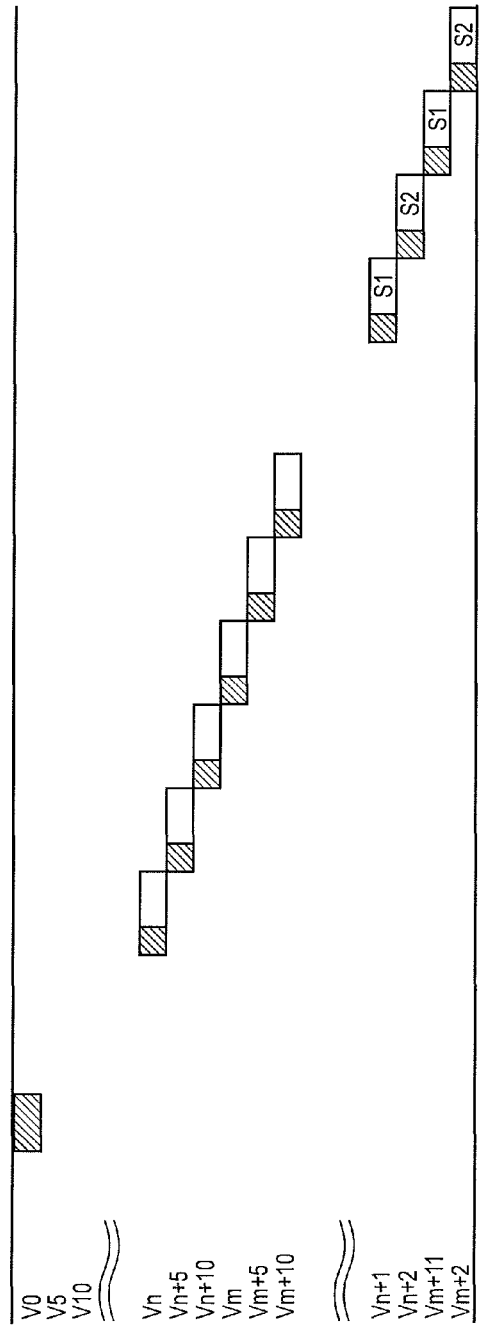
Figure 10C:
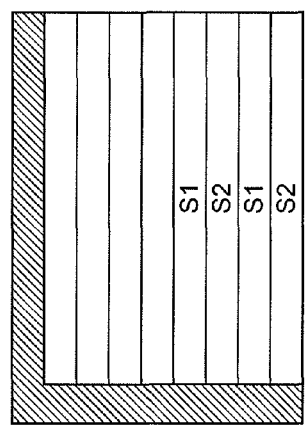

FIGS. 10A to 10C show this state. In FIGS. 10A to 10C, as in FIG. 8, the abscissa represents the lapse of time, and a frame corresponding to each row represents the time during which the readout operation of each row is performed. A hatched portion in the frame indicates that readout of the OB portion 704 is performed.

After the end of the first scanning to read out rows up to the (Vend−5)th row, the target row returns to the (Vn+1)th row and the readout operation continues. Upon completion of the second scanning to read out the (Vn+2)th row, and the (Vm+1)th and (Vm+2)th rows serving as the phase difference detection pixel arrangement rows of the next basic block, vertical scanning in readout of one frame ends. The pixels are rearranged in the order of the readout time, as shown in FIG. 10B, and the readout pixel data are arranged as shown in FIG. 10C.

Since the vertical thinning count is larger than that in the above-described "high-resolution mode", the number of readout pixels in the vertical direction is decreased and the resolution of the image drops. However, the entire screen can be read out in a shorter time.

Note that phase difference detection pixels are arranged on rows which are not read out during the period of the first scanning in thinning readout in both the "high-resolution mode" and "high-speed mode". Horizontal thinning processing in the normal pixel portion is the same as that described above. Horizontal scanning on phase difference detection pixel arrangement rows will be explained. The following example assumes that all pixels in a horizontal OB portion arranged at the start of respective rows out of the OB portion 704 are always read out without being thinned out in the horizontal direction regardless of the state of horizontal scanning.

If the same thinning processing as that for normal rows is performed on phase difference detection pixel arrangement rows, pixels to be actually read out are pixels each surrounded by a thick frame in FIG. 11A. More specifically, only 12 phase difference detection pixels S1, which are half the 24 pixels in the horizontal direction shown in FIG. 11A, are arranged, but only ⅓ of the 12 pixels, that is, four pixels are read out. Similarly, only 12 phase difference detection pixels S2, which are half the 24 pixels in the horizontal direction, are arranged on the next row, but only ⅓ of the 12 pixels, that is, four pixels are read out, too. FIG. 11B shows the relationship between regions to be read out from the entire image. Normal pixels are represented by rows each surrounded by a thick frame, and phase difference detection pixel arrangement rows are represented as rows each surrounded by a hatched double-line frame.

The number of readout pixels out of the phase difference detection pixels is reduced by thinning out the entire screen and reading out every third pixel, similar to a normal pixel row. However, the phase difference detection pixels of the entire screen can be read out. FIG. 11C shows the result of arranging readout pixels.

As shown in FIG. 11C, normal pixels are thinned out to ⅓ in both the horizontal and vertical directions, and phase difference detection pixel rows are read out below normal pixels. As a matter of course, the numbers of pixels to be read out in the horizontal direction on the normal row and phase difference detection row are equal. Since the number of phase difference detection pixels to be actually read out is decreased to ⅓ of the number of originally arranged pixels, the phase difference detection accuracy greatly drops.

To increase the number of phase difference detection pixels to be actually read out, the embodiment adopts a method of not performing horizontal thinning readout on a phase difference detection pixel arrangement row. More specifically, pixels are skipped to an arbitrary coordinate in the horizontal direction. Then, all pixels are read out as in normal readout, and pixels are skipped from a readout end position to the final pixel. This readout method will be explained.

In this case, when scanning a row on which phase difference detection pixels are arranged, the vertical scanning circuit 705 supplies, to the horizontal scanning circuit 708 by the setting signal 710, information representing whether the current row is a phase difference detection pixel arrangement row. If the horizontal scanning circuit 708 determines from the setting signal 710 that the current row is not a phase difference detection pixel arrangement row, it performs horizontal scanning at a thinning rate set by the thinning setting (in this case, ⅓ thinning for every third pixel). If the horizontal scanning circuit 708 determines from the setting signal 710 that the current row is a phase difference detection pixel arrangement row, it ignores the thinning setting signal and switches to an operation of scanning all pixels in a region designated by a readout start position and readout end position set by the skip setting, and skipping readout in preceding and succeeding regions.

In this case, when the target block is read out after the skip, pixels to be actually read out are all pixels each surrounded by a thick frame, as shown in FIG. 12A. All 12 phase difference detection pixels S1, which are half the 24 pixels in the horizontal direction shown in FIG. 12A, and all 12 phase difference detection pixels S2, which are also half the 24 pixels in the horizontal direction shown in FIG. 12A, can be read out. FIG. 12B shows the relationship between regions to be read out from the entire image. Normal pixels are represented by rows each surrounded by a thick frame, and phase difference detection pixel arrangement rows are represented as rows each surrounded by a hatched double-line frame.

No thinning readout is performed, unlike a normal pixel row. Hence, if the entire screen is to be read out in the horizontal direction, the number of pixels becomes triple the number of pixels on a normal row, and the readout time also becomes triple the readout time on a normal row. In a general image capturing system, it is very difficult to change the horizontal sync period for only a specific row. If the readout time is adjusted to match the all-row readout time, it becomes greatly long, losing the original advantage of performing thinning readout to ensure a high frame rate.

To reduce the number of readout pixels on a phase difference detection pixel readout row, the vertical scanning circuit 705 instructs, by the setting signal 710 for setting a row on which a phase difference detection row is arranged, the horizontal scanning circuit 708 about a row on which phase difference detection pixels are arranged. Horizontal scanning start and end positions on the row are designated by the skip setting to skip pixels before the start position and those after the end position so as not to perform horizontal scanning. At this time, the horizontal scanning circuit is set so that the number of pixels to be horizontally scanned becomes ⅓ of the number of pixels in the horizontal direction so as to be almost equal to the number of readout pixels on a normal row. When almost the center of the screen in the horizontal direction is selected as a readout position in this case, pixels are read out as shown in FIG. 12B, and the readout pixels are arranged as shown in FIG. 12C.

As shown in FIG. 12C, normal pixels are thinned out to ⅓ in both the horizontal and vertical directions, and phase difference detection pixel rows are read out below normal pixels. The number of pixels to be read out in the horizontal direction on a phase difference detection row can be set to be almost equal to that on a normal row though it depends on the design of the horizontal scanning circuit. However, even if the number of pixels to be read out in the horizontal direction on a phase difference detection row is different, it is adjusted to match any horizontal sync period and can therefore be set without greatly influencing the frame rate.

In this case, pixels prepared as phase difference detection pixels can be read out without thinning them out though they are limited to a partial region in the screen. Hence, originally intended phase difference detection performance can be obtained.

On a phase difference detection pixel arrangement row, the number of pixels to be read out at once in the horizontal direction is limited to part of the screen. However, by switching the skip position, a pixel at an arbitrary position in the horizontal direction can be read out in every readout operation to perform the phase difference detection operation.

Note that the embodiment has described the setting of the skip position on the premise of the horizontal scanning circuit capable of skipping columns up to an arbitrary column and columns after the arbitrary column. However, the setting of the skip position for an arbitrary column is not always necessary. For example, in the embodiment, the skip position may be determined for every 24 pixels in the horizontal direction serving as the basic unit in the embodiment. Alternatively, the skip position may be set for every 24×n blocks each of 24 pixels. It is only necessary to read out phase difference detection pixels containing a region to undergo phase difference detection. Needless to say, as the number of choices capable of selecting the skip position becomes smaller for the horizontal scanning circuit, increases in the scale of the horizontal scanning circuit itself and the scale of the peripheral circuit of the image pickup device such as a skip position selection circuit can be suppressed.

For descriptive convenience, the embodiment adopts the method of thinning out pixels in horizontal scanning and vertical scanning and reading out pixels. However, the pixel signals of a plurality of pixels may be averaged in the image pickup device to output the average value. This can reduce noise of the signal and folding noise generated by thinning readout.

In the embodiment, averaging is effective if pixel averaging is possible in the normal pixel region. Signals from phase difference detection pixels can be averaged in the screen when pixels having the same phase change direction of the slit are added. For example, in the embodiment, when S1 pixels and G pixels are alternately arranged as on the row Vn+1 in FIG. 4A, the S1 pixels can be averaged by horizontal averaging.

However, for example, when the arrangement density of S1 pixels is low and B image capturing pixels alternately replace the S1 pixels, the S1 pixels and B image capturing pixels are averaged by horizontal averaging, and phase difference detection pixel signals cannot be accurately read out. Generally when horizontal thinning readout, skip readout, and horizontal averaging cooperate with each other, the circuit configuration becomes complicated.

In the embodiment, when pixel averaging is performed in the normal pixel region, it is set not to average signals from phase difference detection pixels in the screen. Therefore, the advantage of pixel addition in the image capturing pixels can be obtained, and an increase in circuit scale can be prevented.

In this way, the horizontal scanning method is switched between the first vertical scanning period in which normal pixel rows are read out, and the second vertical scanning period in which phase difference detection pixel arrangement rows are read out. Therefore, desired phase difference detection performance can be maintained though pixels are limited to a partial region in the screen. By appropriately setting a scanning start position and scanning end position in the horizontal direction, phase difference detection upon designating an arbitrary position becomes possible.

In this case, the horizontal scanning operation except for the skip is readout of all pixels, similar to readout of a still image. Thus, the horizontal scanning operation can be relatively easily implemented without greatly changing the horizontal scanning circuit.

Next, an outline of the imaging operation of the image capturing apparatus shown in FIG. 1 will be explained with reference to the flowchart of FIG. 13. If the power switch 109 is turned on (step S201), the CPU 105 determines whether electric energy necessary for imaging remains in the battery (step S202).

If electric energy necessary for imaging does not remain in the battery, the CPU 105 displays a warning message indicative of this on the LCD 114 (step S211), and returns to step S201 to wait until the power switch 109 is turned on again. If electric energy necessary for imaging remains in the battery, the CPU 105 checks the recording medium 108 (step S203).

This check is performed by determining whether the recording medium 108 capable of recording a predetermined amount or more of data has been mounted in the image capturing apparatus. If the recording medium 108 capable of recording a predetermined amount or more of data has not been mounted in the image capturing apparatus, the CPU 105 displays a warning message indicative of this on the LCD 114 (step S211), and returns to step S201.

If the recording medium 108 capable of recording a predetermined amount or more of data has been mounted in the image capturing apparatus, the CPU 105 advances to step S204. The CPU 105 determines which of the still image obtaining mode, moving image obtaining mode (high-resolution mode), and moving image obtaining mode (high-speed mode) is an imaging mode set with the mode dial 112 (step S204).

If the still image obtaining mode is set, the CPU 105 performs still image obtaining processing (step S205). If the moving image obtaining mode is set, the CPU 105 performs moving image obtaining processing (step S206).

First, details of still image obtainment in step S205 of FIG. 13 will be explained with reference to the flowchart of FIG. 14. In still image obtaining processing, the CPU 105 waits until the shutter switch SW1 is turned on (step S401). If the shutter switch SW1 is turned on, the CPU 105 performs photometry processing of deciding the f-number and shutter speed of the stop 204 of the imaging lens 202 by using photometry information from a photometry control unit (not shown). Also, the CPU 105 performs autofocus processing of focusing the focus adjustment lens group 205 of the imaging lens 202 on the object position by using distance measurement information from the AF unit 209 (step S402).

The CPU 105 determines whether the shutter switch SW2 has been turned on (step S403). If the shutter switch SW2 is OFF, the CPU 105 determines whether the ON state of the shutter switch SW1 continues (step S404). If the ON state of the shutter switch SW1 continues, the CPU 105 returns to step S403 to determine whether the shutter switch SW2 has been turned on. If the ON state of the shutter switch SW1 does not continue, the CPU 105 returns to step S401 to wait until the shutter switch SW1 is turned on again. If the CPU 105 determines in step S403 that the shutter switch SW2 has been turned on, it executes imaging processing (step S405). In the imaging processing, signal readout in the all-pixel readout mode is performed to successively receive signals from normal pixels and phase difference detection pixels.

After that, the CPU 105 controls the DSP 103 to execute development processing on the obtained image data (step S406). The CPU 105 controls the DSP 103 to execute compression processing on the image data having undergone the development processing, and store the compressed image data in a free area of the RAM 107 (step S407).

The CPU 105 controls the DSP 103 to execute readout of image data stored in the RAM 107 and recording processing on the recording medium 108 (step S408). The CPU 105 then checks the ON/OFF state of the power switch 109 (step S409).

If the power switch 109 remains ON, the CPU 105 returns to step S401 to prepare for the next imaging. If the power switch 109 is OFF, the CPU 105 returns to step S201 of FIG. 13 to wait until the power switch is turned on again.

Next, moving image obtaining processing will be explained. In the embodiment, when the image capturing apparatus shifts to the moving image obtaining mode, it performs a monitor operation of opening the shutter, developing image data read out from the image pickup device 101, and keeping displaying it on the LCD 114. While the shutter switch SW2 is ON, moving image data is kept recorded on the recording medium 108. To escape from the moving image obtaining mode, the setting of the mode dial 112 is changed from the moving image obtaining mode, or the power switch 109 is turned off. The moving image mode further includes the "high-resolution mode" and "high-speed mode" so that they can be switched. In the "high-resolution mode", normal pixels on the image pickup device 101 are read out for every third pixel in both the horizontal and vertical directions. In the "high-speed mode", normal pixels on the image pickup device 101 are read out for every third pixel in the horizontal direction and for every fifth pixel in the vertical direction. This switching operation can be performed by changing the settings of the image pickup device 101 and TG 104 in accordance with an instruction from the CPU 105.

In either mode, upon completion of the first vertical scanning to vertically scan normal pixel rows, the second vertical scanning is performed to vertically scan again phase difference detection pixel rows. In readout of phase difference detection pixel rows, the readout operation explained with reference to FIGS. 12A to 12C is performed to execute a predetermined skip operation corresponding to each mode in the horizontal direction, and execute horizontal scanning in a region except for the skip region without thinning. In this case, the number of readout pixels becomes almost $\frac{1}{9}$ in the "high-resolution mode" and almost $\frac{1}{15}$ in the "high-speed mode", greatly shortening the readout time. The following description is common to the "high-resolution mode" and "high-speed mode".

Details of the moving image obtaining processing in step S206 of FIG. 13 will be explained with reference to the flowchart of FIG. 15.

The CPU 105 sets the moving image mode selected with the mode dial 112 (step S300). The CPU 105 performs the mirror-up operation of the main mirror 207 and sub-mirror 208 and the opening operation of the focal plane shutter 210 (step S302). Accordingly, the object image always enters the image pickup device 101, as shown in FIG. 2B.

Then, the CPU 105 determines whether the shutter switch SW2 has been turned on (step S303). If the shutter switch SW2 has been turned on, the CPU 105 starts a recording operation of writing moving image data on the recording medium 108 (step S305). If the shutter switch SW2 is OFF, the CPU 105 stops the recording operation on condition that the recording operation of writing moving image data on the recording medium 108 is being executed (step S304). That is, while the shutter switch SW2 is ON, the CPU 105 continues recording processing of moving image data, and when the shutter switch SW2 is turned off, stops the recording processing of moving image data. For safety, the recording operation may be stopped upon the lapse of a predetermined time or when the recording medium 108 runs short of the capacity even if the shutter switch SW2 is not turned off.

After performing the processing in step S304 or S305, the CPU 105 performs exposure adjustment to perform the monitor operation of repeating monitor display of image data on the LCD 114 (step S306). In the exposure adjustment, the exposure amount is determined from image data obtained immediately before the exposure adjustment, and the stop 204 of the lens and the internal gain of the AFE 102 are set to obtain a proper exposure amount. However, there is no immediately preceding data when obtaining a moving image for the first time. Thus, initial values are set as the stop 204 of the lens and the internal gain of the AFE 102.

After that, the CPU 105 performs imaging processing (step S307). When obtaining a moving image, the image pickup device 101 repetitively executes charge removal, accumulation, and readout in accordance with driving signals from the TG 104. The image pickup device 101 reads out normal pixel rows by thinning out normal pixel rows to ⅓ in the "high-resolution mode" or ⅕ in the "high-speed mode" in the vertical direction, and ⅓ in the horizontal direction. Upon completion of scanning normal pixels, the image pickup device 101 performs an operation of skipping a phase difference detection pixel row up to a predetermined position in the horizontal direction, and then reading out all pixels from this position up to a readout end position. Readout of normal pixels and readout of phase difference detection pixels are repeated at a predetermined frame rate. At this timing, the skip position on the phase difference detection pixel arrangement row is also designated. This position is designated in accordance with a region where AF is performed. Further, only phase difference detection pixel outputs which appear during the second vertical scanning period in the readout image pickup device are input to the AF correction block 1009 in the DSP 103. The AF correction block 1009 performs correction of each pixel and correction corresponding to optical conditions in imaging, and transfers the correction results to the AF block 1006. The AF correction block 1009 calculates autofocus information based on outputs from the two types of pixels S1 and S2 in which slits of different phases are formed. The CPU 105 receives the calculation result, and performs autofocus control by controlling the position of the focus adjustment lens group 205 in the imaging lens 202.

Normal pixel outputs which appear during the first vertical scanning period in the image pickup device undergo correction processing (step S308) for a defective pixel in the image pickup device by the development block 1001, and development processing (step S309). Further, the compression block 1002 performs compression processing (step S310), and the processing result is displayed on the LCD 114 by using the LCD display control block 1005 (step S311). By repeating this operation at a frame rate necessary for display, an operation for a moving image becomes possible.

Figure 13:
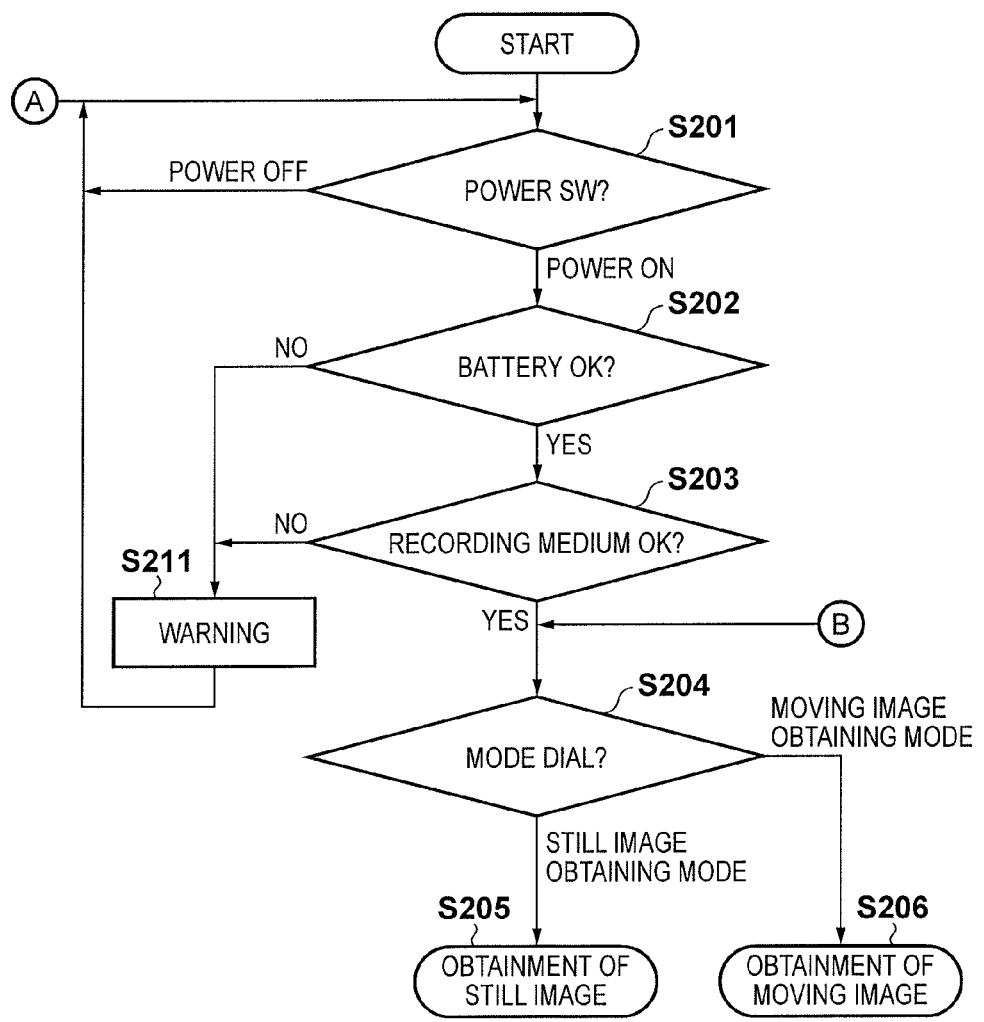
FIG. 13 is a flowchart showing the operation of the image capturing apparatus.
Figure 14:
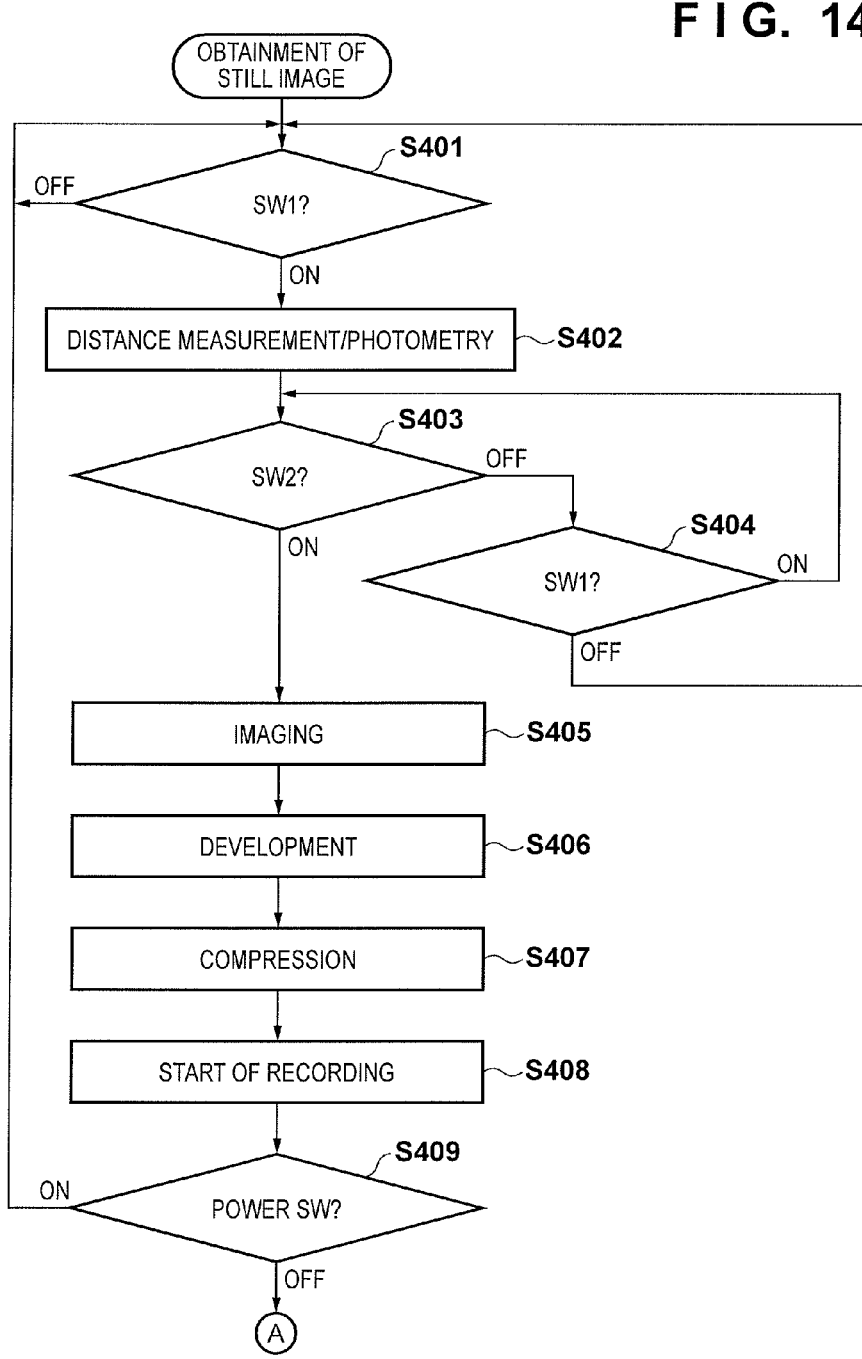
FIG. 14 is a flowchart showing an operation when obtaining a still image in the image capturing apparatus.

If the power switch 109 is OFF (step S312), the CPU 105 performs moving image end processing (step S314), and returns to step S201 of FIG. 13. If the power switch 109 remains ON (step S312), the CPU 105 checks the mode dial 112 (step S313).

If the mode dial 112 remains in the moving image mode, the CPU 105 returns to step S303. If the mode dial 112 has been switched to the still image mode, the CPU 105 performs moving image end processing (step S315), and returns to step S204 of FIG. 13.

In the moving image end processing of steps S314 and S315, if the recording operation is being executed, the recording operation is stopped, driving of the image pickup device 101 is stopped, and readout processing of the DSP 103 is stopped. Further, the focal plane shutter 210 is closed, and the mirror-down operation of the main mirror 207 and sub-mirror 208 is performed.

As described above, in the moving image mode, a moving image is generated using the normal pixel region read out by the first half vertical scanning. In addition, autofocus information is calculated using outputs from phase difference detection pixels read out by the second half vertical scanning. This can implement autofocus control using only outputs from the phase difference detection pixels while improving the quality of image data.

Since image data are output in the order of (image generation data)⇒(phase difference detection image data), the processing contents can also be separated in the time direction. This omits the labor of performing conventional processing for extracting phase difference detection pixels from image generation data, and distributing one of the pixels to development processing and the other one to an AF block for phase difference detection calculation. Processing of correcting data from phase difference detection pixels in order to generate image data also becomes unnecessary, greatly increasing the processing efficiency.

In the readout method of the image pickup device when obtaining a moving image according to the embodiment, phase difference detection pixels are arranged so that their outputs do not appear in the moving image generation region in both the "high-resolution mode" and "high-speed mode". Thus, there is no fear of degradation of the image quality caused by phase difference detection pixels each exhibiting an output different from that of a normal pixel. Further, the phase difference can be detected at desired accuracy though the region is limited.

According to the embodiment, in the moving image mode, outputs from normal pixels are read out by the first half vertical scanning to generate a moving image, and outputs from phase difference detection pixels are read out by the second half vertical scanning to calculate autofocus information. However, the processing may be changed so that outputs from phase difference detection pixels are read out first by the second vertical scanning to calculate autofocus information, and then outputs from normal pixels are read out by the first vertical scanning to generate a moving image. The changed processing has an advantage capable of driving the lens more quickly because autofocus information can be detected first. The processing can be easily changed by only changing the scanning order of the vertical scanning circuit. The CPU 105 can also set and switch, for each frame or the like, which of the first vertical scanning and second vertical scanning is performed first.

(Second Embodiment)

An image capturing apparatus according to the second embodiment of the present invention will be described below. The second embodiment is different from the first embodiment in that a more efficient phase difference detection pixel readout method is provided by further improving the horizontal scanning method of a phase difference detection pixel arrangement row when obtaining a moving image. The second embodiment is therefore different from the first embodiment in the part explained with reference to FIGS. 12A to 12C in the first embodiment. The second embodiment is common to the first embodiment except for the horizontal scanning method, so an operation corresponding to FIGS. 12A to 12C in the first embodiment will be described with reference to FIGS. 16A to 16C.

When a readout operation of thinning out a phase difference detection pixel arrangement row to ⅓ in the horizontal direction is performed similarly to normal pixels, as shown in FIGS. 11A to 11C, the number of phase difference detection pixels to be actually read out is decreased to ⅓ of the number of originally arranged pixels. As a result, the phase difference detection accuracy greatly drops.

In the first embodiment, phase difference detection pixels are read out successively in the horizontal direction in the first embodiment so as not to decrease the phase difference detection accuracy. In this case, it is difficult to read out all pixels in the horizontal direction, so the pixels have to be limited to a partial region in the horizontal direction.

To further enlarge the region of phase difference detection pixels to be read out, the second embodiment performs horizontal thinning readout optimized to the arrangement of phase difference detection pixels on a phase difference detection pixel arrangement row. Thus, a maximum readable region in the horizontal direction can be ensured. The following explanation assumes that the "high-resolution mode" in which pixels are thinned out to ⅓ in the vertical direction is used in readout of normal pixels.

In this case, when scanning a row on which phase difference detection pixels are arranged, a vertical scanning circuit 705 supplies, to a horizontal scanning circuit 708 by a setting signal 710, information representing whether the current row is a phase difference detection pixel arrangement row. In the embodiment, information capable of determining which of a row on which pixels S1 are arranged and a row on which pixels S2 are arranged is the phase difference detection pixel arrangement row is further added to this information.

If the horizontal scanning circuit 708 determines from the setting signal 710 that the current row is not a phase difference detection pixel arrangement row, it performs horizontal scanning at a thinning rate set by the thinning setting (in this case, ⅓ thinning for every third pixel). If the horizontal scanning circuit 708 determines from the setting signal 710 that the current row is a phase difference detection pixel arrangement row, it ignores the thinning setting signal and switches to an operation (½ thinning) of reading out every other pixel in a region designated by a readout start position and readout end position set by the skip setting.

Figure 16A:
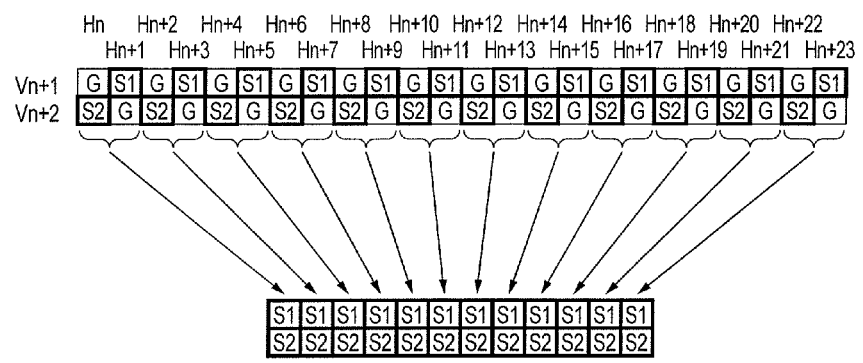
FIGS. 16A to 16C are views showing readout pixels in the moving image obtaining mode in an image capturing apparatus according to the second embodiment.

Further, the horizontal scanning circuit 708 performs control of determining which of a row on which the pixels S1 are arranged and a row on which the pixels S2 are arranged is the target row out of phase difference detection pixel arrangement rows, and then switching the thinning start pixel, that is, the thinning phase. In this case, when the target block is read out after the skip, pixels to be actually read out are pixels each surrounded by a thick frame, as shown in FIG. 16A.

More specifically, pixels on columns Hn+1, Hn+3, Hn+5, . . . , Hn+21, and Hn+23 in the horizontal direction are read out from the row Vn+1, and pixels on columns Hn, Hn+2, Hn+4, . . . , Hn+20, and Hn+22 in the horizontal direction are read out from the row Vn+2. By this operation, all 12 phase difference detection pixels S1, which are half the 24 pixels in the horizontal direction shown in FIG. 16A, and all 12 phase difference detection pixels S2, which are also half the 24 pixels in the horizontal direction shown in FIG. 16A, can be read out.

Figure 16B:
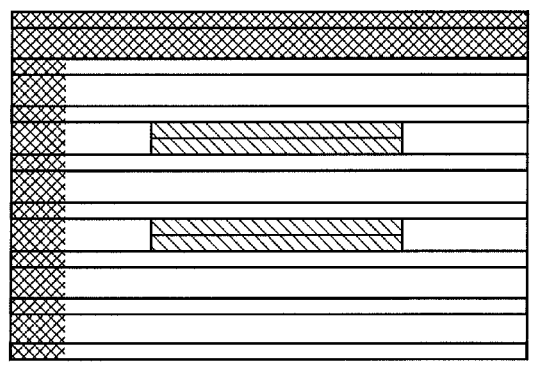

FIG. 16B shows the relationship between regions to be read out from the entire image. Normal pixels are represented by rows each surrounded by a thick frame, and phase difference detection pixel rows are represented as rows each surrounded by a hatched double-line frame. Unlike a normal pixel row, phase difference detection pixels undergo ½ thinning readout. If the entire screen is to be read out in the horizontal direction, the number of pixels becomes 3/2 of the number of pixels on a normal row, and readout takes 3/2 of the time of a normal row. In a general image capturing system, it is very difficult to change the horizontal sync period for only a specific row. If the readout time is adjusted to match the all-row readout time, it becomes greatly long, losing the original advantage of performing thinning readout to ensure a high frame rate.

To reduce the number of readout pixels on a phase difference detection pixel readout row, horizontal scanning start and end positions on the phase difference detection pixel row are designated by the skip setting so as not to horizontally scan pixels before the start position and those after the end position. At this time, the horizontal scanning circuit is set so that the number of pixels to be horizontally scanned becomes almost ⅔ of the number of pixels in the horizontal direction so as to be almost equal to the number of readout pixels on a normal row. The setting signal 710 also outputs information representing which of a row on which the phase difference detection pixels S1 are arranged and a row on which the phase difference detection pixels S2 are arranged is a row currently selected by the vertical scanning circuit.

In accordance with this information, the horizontal scanning circuit switches to start the horizontal thinning operation starting from, for example, Hn in FIG. 16A or the horizontal thinning operation starting from Hn+1. When almost the center of the screen in the horizontal direction is selected as a readout position in this case, pixels are read out as shown in FIG. 16B, and the readout pixels are arranged as shown in FIG. 16C.

Figure 16C:
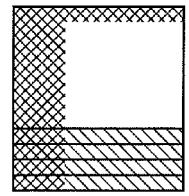

As shown in FIGS. 16A to 16C, normal pixels are thinned out to ⅓ in both the horizontal and vertical directions, and phase difference detection pixel rows are read out below normal pixels. The number of pixels to be read out in the horizontal direction on a phase difference detection row can be set to be almost equal to that on a normal row though it depends on the design of the horizontal scanning circuit. However, even if the number of pixels to be read out in the horizontal direction on a phase difference detection row is different, it is adjusted to match any horizontal sync period and can therefore be set without greatly influencing the frame rate.

Pixels prepared as phase difference detection pixels can be read out without thinning them out though they are limited to a partial region in the screen. Hence, originally intended phase difference detection performance can be obtained.

On a phase difference detection pixel arrangement row, the number of pixels to be read out at once in the horizontal direction is limited to part of the screen. However, by switching the skip position, a pixel at an arbitrary position in the horizontal direction can be read out in every readout operation to perform the phase difference detection operation. Further, the limited region can be ensured to be wider than that in the first embodiment. The effect of greatly reducing the frequency at which the phase difference detection region is switched in actual use can be expected.

Note that the above description is premised on the "high-resolution mode" in which pixels are thinned out to ⅓ in the vertical direction in readout of normal pixels. However, horizontal readout can be implemented by taking the same measure even in the "high-speed mode" in which pixels are thinned out to ⅕ in the vertical direction.

Note that the embodiment has described the setting of the skip position on the premise of the horizontal scanning circuit capable of skipping columns up to an arbitrary column and columns after the arbitrary column. However, the setting of the skip position for an arbitrary column is not always necessary. For example, in the embodiment, the skip position may be determined for every 24 pixels in the horizontal direction serving as the basic unit in the embodiment. Alternatively, the skip position may be set for every 24×n blocks each of 24 pixels. It is only necessary to read out phase difference detection pixels containing a region to undergo phase difference detection.

Needless to say, as the number of choices capable of selecting the skip position becomes smaller for the horizontal scanning circuit, increases in the scale of the horizontal scanning circuit itself and the scale of the peripheral circuit of the image pickup device such as a skip position selection circuit can be suppressed.

For descriptive convenience, the embodiment adopts the method of thinning out pixels in horizontal scanning and vertical scanning and reading out pixels. However, pixel averaging may be performed in the normal pixel region. In this case, by setting not to average signals from phase difference detection pixels in the screen, the advantage of pixel addition can be obtained and the phase difference detection accuracy can be maintained.

In this fashion, the horizontal scanning method is switched between a normal pixel row and a phase difference detection pixel arrangement row. Desired phase difference detection performance can be maintained though pixels are limited to a partial region in the screen. By appropriately setting a scanning start position and scanning end position in the horizontal direction, phase difference detection upon designating an arbitrary position becomes possible.

As described above, in the moving image mode, a moving image is generated using the normal pixel region in the first half scanning in the vertical direction. In addition, autofocus information is calculated using outputs from phase difference detection pixels in the second half scanning in the vertical direction. This can implement autofocus control using only outputs from the phase difference detection pixels while improving the quality of image data.

Similar to the first embodiment, since image data are output in the order of (image generation data)⇒(phase difference detection image data), the processing contents can be separated in the time direction. This omits the conventional processing of extracting phase difference detection pixels from image generation data, and distributing one of the pixels to development processing and the other one to an AF block for phase difference detection calculation. Processing of correcting data from phase difference detection pixels in order to generate image data also becomes unnecessary, greatly increasing the processing efficiency.

Even in the second embodiment, pixel outputs from phase difference detection pixels do not appear in the moving image generation region in the readout method of the image pickup device when obtaining a moving image. Thus, there is no fear of degradation of the image quality caused by phase difference detection pixels each exhibiting an output different from that of a normal pixel. Further, the phase difference can be detected at desired accuracy though the region is limited.

The first and second embodiments of the present invention have been described above. However, the present invention is not limited to these embodiments, and various modifications and changes can be made without departing from the scope of the invention.

Especially, the above-described embodiments are premised on the arrangement of phase difference detection pixels as shown in FIG. 4A, but the present invention is not always limited to this arrangement. When the arrangement density of phase difference detection pixels in the horizontal direction is much lower than the thinning rate in readout in the horizontal direction, the effects of the above-described embodiments cannot be obtained. However, when the arrangement density of phase difference detection pixels in the horizontal direction is high and is equal to or higher than the thinning rate in readout in the horizontal direction particularly on a specific row, the effects of the above-described above are enhanced.

The effects can be maximized by implementing the horizontal scanning method by a circuit which can perform appropriate scanning corresponding to a pattern in which phase difference detection pixels are actually arranged. Even in this case, it is difficult to read out phase difference detection pixels in the entire region of an obtained image by one readout operation in accordance with the arrangement density of phase difference detection pixels, and the region needs to be limited. However, both high phase difference detection accuracy and high readout speed can be achieved.

Further, the region of image data used for image generation and the region of data used to detect a phase difference are clearly separated in the time direction. When processing the respective data in subsequent stages, it is unnecessary to perform conventional processing of extracting phase difference detection pixels from image generation data, and distributing one of the pixels to development processing and the other one to an AF block for phase difference detection calculation. Processing of correcting data from phase difference detection pixels in order to generate image data also becomes unnecessary, greatly increasing the processing efficiency.

(Third Embodiment)

Next, an image capturing apparatus according to the third embodiment of the present invention will be described. Unlike the first and second embodiments, the third embodiment provides a method of not successively arranging, in the vertical direction, rows on which focus detection pixels to be read out by the second scanning are arranged, thereby suppressing degradation of the image quality caused by the influence of focus detection pixels when obtaining a still image. The third embodiment is different from the first and second embodiments in the part explained with reference to FIGS. 4A, 4B, 8, and 9A to 9C in the first embodiment. The third embodiment is common to the first embodiment except for the arrangement of focus detection pixels and the vertical scanning method, and a description thereof will not be repeated.

FIGS. 17A and 17B are views showing the pixel arrangement of an image pickup device 101 used in the embodiment. FIGS. 17A and 17B show the arrangement of pixels on the image pickup device. In FIGS. 17A and 17B, R represents a normal pixel (imaging pixel) in which a red color filter is arranged, and G and B represent normal pixels in which a green color filter and blue color filter are arranged, respectively. Here, 24 pixels in the horizontal direction×15 pixels in the vertical direction on the image pickup device are extracted and explained. However, the entire image pickup device is formed by basically repeating this arrangement pattern in the horizontal and vertical directions.

In FIGS. 17A and 17B, S1 and S2 represent phase difference detection pixels (focus detection pixels) arranged in normal pixels. As shown in FIG. 5A, S1 includes a microlens 501, underlying planarizing layer 502, photodiode 504, and light-shielding wiring layer 503. The pixel S1 is the first phase difference detection pixel in which a slit for regulating the incident direction of incident light is formed in the light-shielding wiring layer 503 in the pixel. The center position of the slit is offset leftward by a phase 506 from an optical axis center 505 of the pixel. As shown in FIG. 5B, S2 is formed by offsetting, in a direction different from the regulation direction shown in FIG. 5A, a slit for regulating the incident direction of incident light by using a light-shielding film such as an aluminum wiring layer in the pixel. The center position of the slit is offset rightward by a phase 507 from the optical axis center 505 of the pixel. The absolute value of the offset amount in the pixel S2 is equal in to that of the offset value in the pixel S1 though only the direction is different. The pixel S2 is the second phase difference detection pixel.

A pixel group of the pixels S1 having the same phase displacement direction of the slit of the phase difference detection pixel is arranged on a given row Vn+7, as shown in FIG. 17A. A pixel group of the pixels S2 is arranged on a lower row Vn+11. These two rows form one AF frame (AF region). Information about a distance to an object can be calculated by detecting a phase difference from image data of these two groups that are generated from the phase difference detection pixel groups of the respective phases. More specifically, the pixels S1 are arranged regularly in the horizontal direction, and an object image acquired by the group of these pixels is defined as an A image. The pixels S2 are also arranged regularly in the horizontal direction, and an object image acquired by the group of these pixels is defined as a B image. By detecting the relative positions of the A and B images, the focus shift amount (defocus amount) of the object image can be detected.

Figure 18:
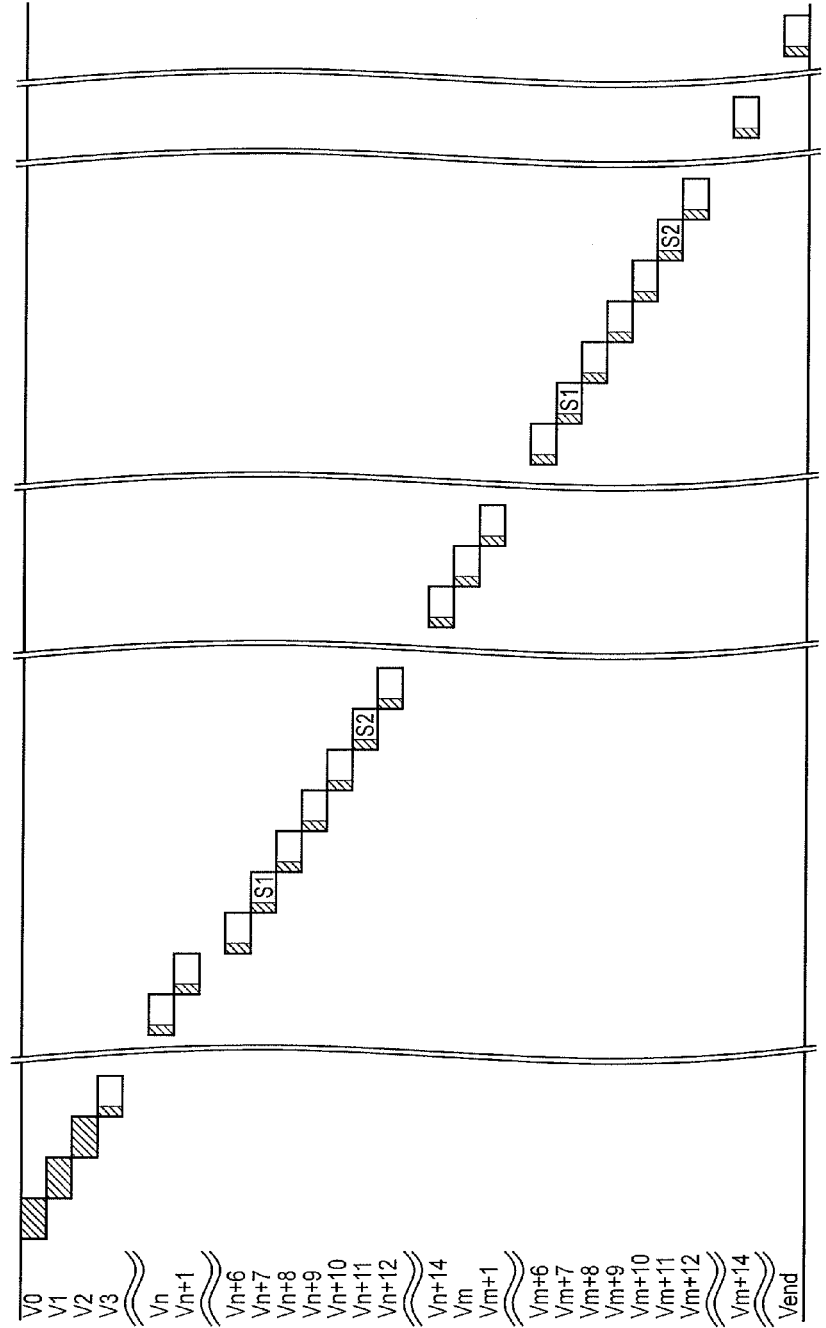
FIG. 18 is a view for explaining a readout operation in the all-pixel readout mode according to the third embodiment.

FIG. 18 is a view for explaining a readout operation in the image capturing apparatus according to the embodiment. This readout operation assumes an operation in the all-pixel readout mode used to read out a still image. In FIG. 18, the abscissa represents the lapse of time, and a frame corresponding to each row represents the time during which the readout operation of each row is performed. A hatched portion in the frame indicates that readout of an OB portion 704 is performed.

Image data read out by still image readout contains normal pixels and in addition, phase difference detection pixels which cannot be used as image signals. An image correction block 1008 in a DSP 103 generates an image signal at the position of a phase difference detection pixel. Generally in this correction processing, the correction target pixel (phase difference detection pixel) is interpolated and generated by referring to signal outputs from normal pixels near the correction target pixel, and estimating the pattern and signal strength of the object. In the embodiment, rows on which phase difference detection pixels are arranged are configured at an interval equal to or larger than the color filter arrangement cycle so that a normal pixel of the same color as a color signal at the position of a correction target pixel is arranged nearby. With this arrangement, image signal interpolation processing can be performed at high accuracy.

An image is generated from the corrected image data by using a development processing block 1001, compression block 1002, and memory control block 1003 in the DSP 103.

The following description assumes that the moving image mode includes the "high-resolution mode" and "high-speed mode" in accordance with a mode dial 112. For example, in the "high-resolution mode", thinning readout is performed for every third pixel in both the horizontal and vertical directions. In the "high-speed mode", thinning readout is performed for every third pixel in the horizontal direction and for every fifth pixel in the vertical direction. The "high-resolution mode" handles high-resolution moving image data having a large number of recording pixels as the output format of a final moving image though this is defined by the readout method of the image pickup device. The "high-speed mode" generally handles moving image data having a high frame rate as the output format of a final moving image.

For example, output formats suited to the respective readout methods are obtained by setting an output having a 1920×1080 moving image size at 30 fps in the "high-resolution mode", and an output having a 1080×720 moving image size at 60 fps in the "high-speed mode".

In the "high-resolution mode" serving as the first mode, every third pixel is read out in the vertical direction, so pixel outputs each surrounded by a double line are read out in the basic block of FIG. 17A. More specifically, pixels on columns Hn+1, Hn+4, Hn+7, Hn+10, Hn+13, Hn+16, Hn+19, and Hn+22 in the horizontal direction and rows Vn, Vn+3, Vn+6, Vn+9, and Vn+12 in the vertical direction are read out. This relationship also applies to a block starting from Vm in the vertical direction.

Figure 19A:
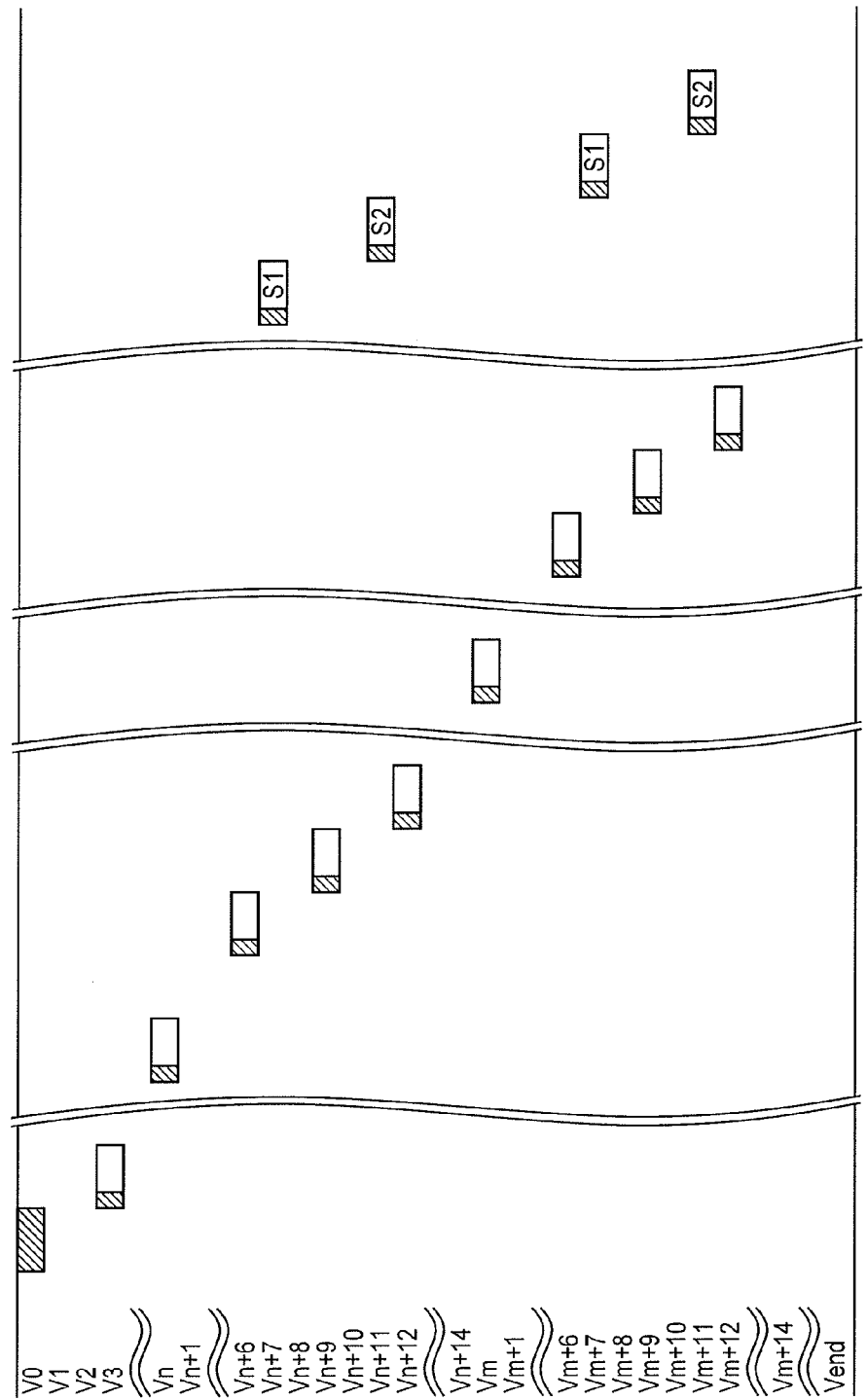
FIGS. 19A to 19C are views for explaining a readout operation in the high-resolution mode for a moving image according to the third embodiment.
Figure 19B:
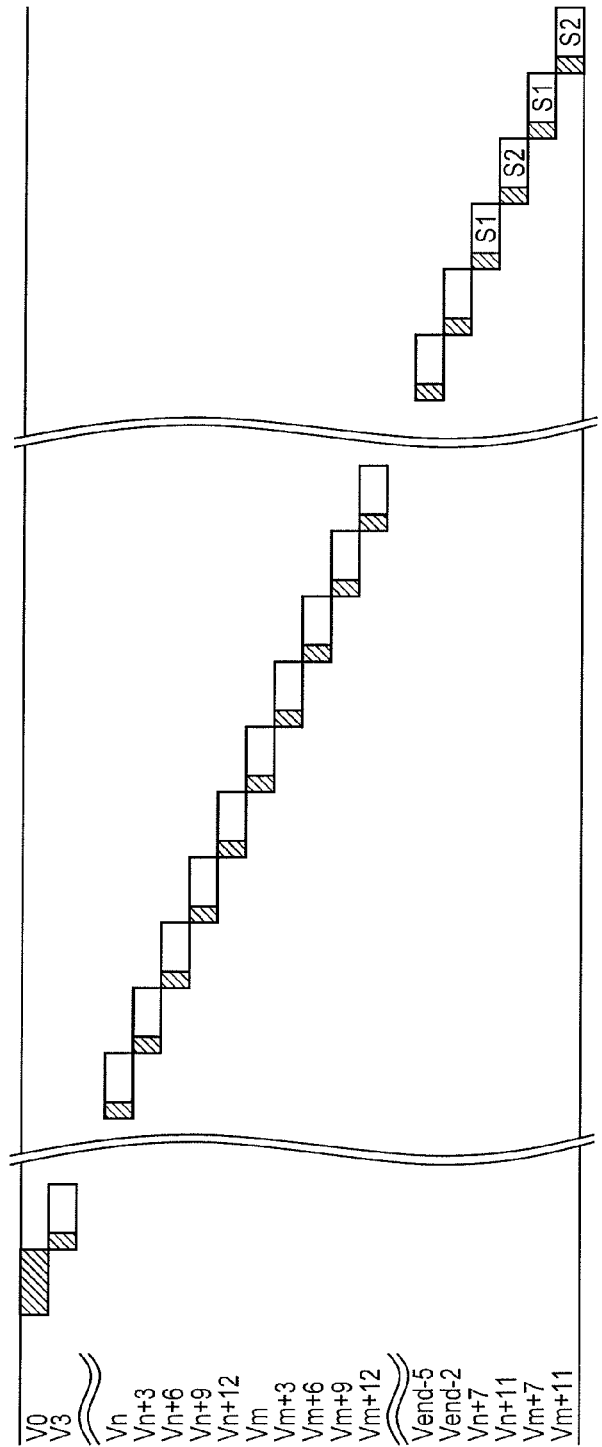
Figure 19C:
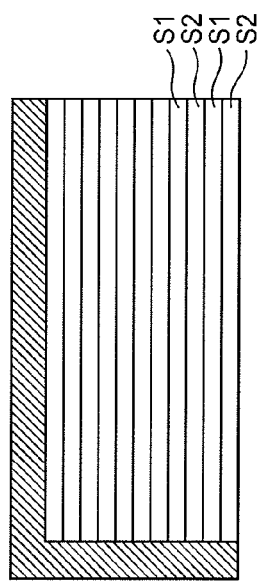

In this case, only by a normal thinning operation, the (Vn+7)th and (Vn+11)th rows on which phase difference detection pixels are arranged are thinned out in the vertical direction and are not read out in the image portion. In the embodiment, however, after the end of the first vertical scanning to read out normal pixels by the thinning operation, the second vertical scanning operation is performed to read out again only rows in each pixel block on which phase difference detection pixels are arranged. FIGS. 19A to 19C show this state.

In FIGS. 19A to 19C, as in FIG. 18, the abscissa represents the lapse of time, and a frame corresponding to each row represents the time during which the readout operation of each row is performed. A hatched portion in the frame indicates that readout of the OB portion 704 is performed. After the end of the first scanning to read out rows up to the (Vend−2)th row, the target row returns to the (Vn+7)th row and the readout operation continues. Upon completion of the second scanning to read out the (Vn+11)th row, and the (Vm+7)th and (Vm+11)th rows serving as the phase difference detection pixel arrangement rows of the next basic block, vertical scanning in readout of one frame ends.

The embodiment has exemplified the block starting from Vn and the block starting from Vm as an example of blocks containing phase difference detection pixels. However, the number of blocks and the arrangement of phase difference detection rows in each block can be arbitrarily set. In any arrangement, it suffices to read out normal pixels while thinning out rows, and then perform readout scanning on rows on which phase difference detection pixels are arranged. The pixels are rearranged in the order of the readout time, as shown in FIG. 19B, and the readout pixel data are arranged as shown in FIG. 19C.

Image data of a row on which phase difference detection pixels are arranged is unnecessary for image generation when reading out a moving image. The development processing block 1001 and compression block 1002 in the DSP 103 generate an image by using image data read out first from the image pickup device during the thinning readout period. Then, an AF block 1006 in the DSP 103 performs only focus detection processing by using image data from subsequent phase difference detection rows.

In FIGS. 19A to 19C, the readout time of each row is shorter than the readout time shown in FIG. 18. This indicates that the number of readout pixels per row is decreased by the horizontal thinning operation, and even if pixels are read out at the same readout speed, the readout time per row is shortened. By reducing the number of readout pixels by the horizontal and vertical thinning operations, a desired frame rate of a moving image can be implemented.

Next, a case in which the "high-speed mode" serving as the second mode is selected with the mode dial 112 will be explained. In this case, since every fifth pixel is read out in the vertical direction, pixel outputs each surrounded by a double line are read out in the basic block of FIG. 17A, as shown in FIG. 17B.

More specifically, pixels on columns Hn+1, Hn+4, Hn+7, Hn+10, Hn+13, Hn+16, Hn+19, and Hn+22 in the horizontal direction, as in the "high-resolution mode", and rows Vn, Vn+5, and Vn+10 in the vertical direction are read out. This relationship also applies to a block starting from Vm in the vertical direction. In this case, only by a normal thinning operation, the (Vn+7)th and (Vn+11)th rows on which phase difference detection pixels are arranged are thinned out in the vertical direction, and are not read out, as in the "high-resolution mode" described above.

In the embodiment, however, after the end of the first vertical scanning to read out normal pixels by the thinning operation, the second vertical scanning operation is performed to read out again only rows in each pixel block on which phase difference detection pixels are arranged.

Figure 20A:
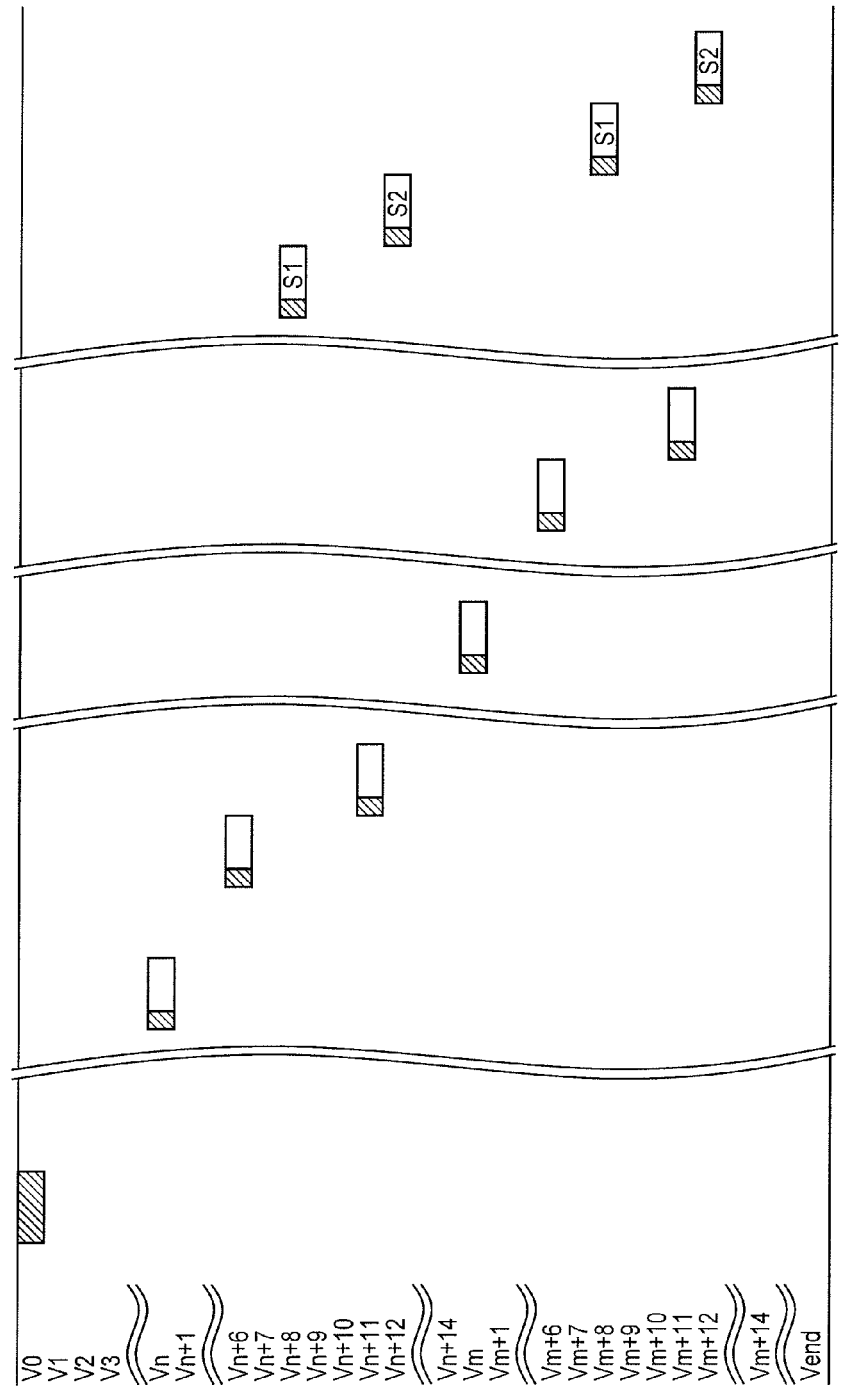

FIGS. 20A to 20C show this state. In FIGS. 20A to 20C, as in FIG. 18, the abscissa represents the lapse of time, and a frame corresponding to each row represents the time during which the readout operation of each row is performed. A hatched portion in the frame indicates that readout of the OB portion 704 is performed.

After the end of the first scanning to read out rows up to the (Vend−5)th row, the target row returns to the (Vn+7)th row and the readout operation continues. Upon completion of the second scanning to read out the (Vn+11)th row, and the (Vm+7)th and (Vm+11)th rows serving as the phase difference detection pixel arrangement rows of the next basic block, vertical scanning in readout of one frame ends.

The pixels are rearranged in the order of the readout time, as shown in FIG. 20B, and the readout pixel data are arranged as shown in FIG. 20C.

Since the vertical thinning count is larger than that in the above-described "high-resolution mode", the number of readout pixels in the vertical direction is decreased and the resolution of the image drops. However, the entire screen can be read out in a shorter time.

Note that phase difference detection pixels are arranged on rows which are not read out during the period of the first scanning in thinning readout in both the "high-resolution mode" and "high-speed mode". The contents of the horizontal thinning method in the normal pixel portion and phase difference detection pixels are common to those described in the first and second embodiments, and a description thereof will not be repeated.

The third embodiment of the present invention has been described above. However, the present invention is not limited to this embodiment, and various modifications and changes can be made without departing from the scope of the invention.

Especially, the above-described embodiment is premised on the arrangement of phase difference detection pixels as shown in FIG. 17A, but the present invention is not always limited to this arrangement. Even when the arrangement density of phase difference detection pixels in the horizontal direction is changed or when the phase difference detection pixels S1 and S2 in FIG. 17A are arranged on the same row, the same effects as those described above can be obtained.

As described above, in the third embodiment, rows on which phase difference detection pixels to be read out by the second scanning are arranged are not arranged successively in the vertical direction. This can implement, at high accuracy, interpolation processing for generating an image signal at the position of a phase difference detection pixel in all-pixel readout when obtaining a still image. In particular, normal pixels having a color filter of a color to be interpolated are arranged near the positions of phase difference detection pixels. As a result, high-accuracy interpolation processing can be implemented.

Further, in readout when obtaining a moving image, the region of image data used for image generation and the region of data used to detect a phase difference are clearly separated in the time direction. When processing the respective data in subsequent stages, it is unnecessary to perform conventional processing of extracting phase difference detection pixels from image generation data, and distributing one of the pixels to development processing and the other one to an AF block for phase difference detection calculation. Processing of correcting data from phase difference detection pixels in order to generate image data also becomes unnecessary, greatly increasing the processing efficiency.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2013-105626, filed May 17, 2013 and 2014-013641, filed Jan. 28, 2014, which are hereby incorporated by reference herein in their entirety.

What is claimed is:

1. An image capturing apparatus comprising:
an image pickup device that includes a plurality of imaging pixels configured to capture an object image, and focus detection pixels arranged in an arrangement of the plurality of imaging pixels;
a CPU that controls to perform a first vertical scanning for image generation in which signals of the pixels included in a plurality of rows that do not include the focus detection pixels are read out and, before or after the first vertical scanning in a readout period of one frame, to perform a second vertical scanning for focus detection in which signals of the pixels included in a plurality of rows that include the focus detection pixels are read out; and
a digital signal processor that performs different correction processes for signals read out by the first vertical scanning and the second vertical scanning in each one frame,
wherein said CPU controls to perform the first vertical scanning at a first predetermined thinning rate in a first readout node and to perform the first vertical scanning at a second predetermined thinning rate different from the first predetermined thinning rate in a second readout mode to acquire a plurality of sequential object images,
wherein the focus detection pixels are arranged at a plurality of rows which are thinned out in the first vertical scanning in the first readout mode and also thinned out in the first vertical scanning in the second readout mode,
wherein said CPU controls to perform a third vertical scanning for still image generation in which signals are read out without thinning, and
wherein the digital signal processor performs correction processing for signals read out from defective pixels included in the plurality of imaging pixels and focus detection pixels by third vertical scanning, and perform the different correction processing for signals read out from focus detection pixels by the first vertical scanning and the second vertical scanning.

2. The apparatus according to claim 1, wherein said CPU reads out the signals of the pixels of said image pickup device in a vertical direction at the first thinning rate and a first thinning phase in the first readout mode, and reads out the signals of the pixels of said image pickup device in the vertical direction at the second thinning rate and a second thinning phase in the second readout node.

3. The apparatus according to claim 1, wherein said CPU switches, between the first vertical scanning and the second vertical scanning, a horizontal scanning method of reading out the signals of the pixels.

4. The apparatus according to claim 3, wherein said horizontal scanning method includes a ⅓ thinning mode and a ½ thinning mode.

5. The apparatus according to claim 3, wherein the focus detection pixels are arranged in predetermined density, which is equal to or higher than a thinning rate of the horizontal scanning method, in the arrangement of the plurality of imaging pixels.

6. The apparatus according to claim 1, wherein said CPU changes the first readout mode and the second readout mode in accordance with the number of recording pixels set for obtaining a moving image.

7. The apparatus according to claim 1, wherein said CPU changes the first readout mode and the second readout mode in accordance with a frame rate set for obtaining a moving image.

8. The apparatus according to claim 1, wherein a horizontal scanning method of reading out the signals of the pixels in a horizontal direction in the second vertical scanning includes a scanning method of skipping readout of signals of pixels in a specific region in the horizontal direction, and reading out signals of the pixels in a region not skipped, while thinning out the signals of the pixels at a thinning rate lower than a thinning rate used when reading out the pixels in the horizontal direction in the first vertical scanning or without thinning out the signals of the pixels.

9. The apparatus according to claim 8, wherein said CPU reads out signals of all focus detection pixels in the region not skipped.

10. The apparatus according to claim 8, wherein the specific region is specified in accordance with a region where a focus detection process is performed.

11. The apparatus according to claim 1, wherein rows on which the focus detection pixels are arranged are not successively arranged in a vertical direction.

12. The apparatus according to claim 1, wherein said CPU controls to perform the first vertical scanning for every third row or for every fifth row.

13. The apparatus according to claim 1, wherein said focus detection pixels include a light-shielding film comprising a wiring layer.

14. The apparatus according to claim 1, wherein said processor processes the signals to correct corresponding to optical conditions in an imaging lens.

15. The apparatus according to claim 1, wherein said CPU switches, for the each one frame, which of the first vertical scanning and second vertical scanning is performed first.

16. The apparatus according to claim 1, wherein the processor further generates a moving image from the signals of the pixels included in the plurality of rows that does not include the focus detection pixels in each one frame.

17. The apparatus according to claim 1, wherein the digital signal processor performs correction processing, different from correction processing for the signals of the imaging pixels, for the signals of the focus detection pixels included in the plurality of rows in each one frame.

18. A method of controlling an image capturing apparatus including an image pickup device that includes a plurality of imaging pixels configured to capture an object image, and focus detection pixels arranged in an arrangement of the plurality of imaging pixels, the method comprising:
controlling to perform a first vertical scanning for image generation in which signals of the pixels included in a plurality of rows that do not include the focus detection pixels are read out and, before or after the first vertical scanning in a readout period of one frame, to perform a second vertical scanning for focus detection in which signals of the pixels included in a plurality of rows that include the focus detection pixels are read out; and
performing different correction processes for signals read out by the first vertical scanning and the second vertical scanning in each one frame,
wherein in the controlling, the first vertical scanning at a first predetermined thinning rate is performed in a first readout mode and the first vertical scanning at a second predetermined thinning rate different from the first predetermined thinning rate is performed in a second readout mode to acquire a plurality of sequential object images,
wherein the focus detection pixels are arranged at a plurality of rows which are thinned out in the first vertical scanning in the first readout mode and also thinned out in the first vertical scanning in the second readout mode,
wherein in the controlling, a third vertical for still image generation in which signals are read out without thinning is performed, and wherein in the performing, correction processing for signals read out from defective pixels included in the plurality of imaging pixels and foots detection pixels by third vertical scanning is performed, and the different correction processing for signals read out from focus detection pixels by the first vertical scanning and the second vertical scanning is performed.

* * * * *